US011645592B2

(12) United States Patent
Martynov

(10) Patent No.: US 11,645,592 B2
(45) Date of Patent: May 9, 2023

(54) ANALYZING CLOUD BACKUP SERVICE OPTIONS USING HISTORICAL DATA PROTECTION ACTIVITIES

(71) Applicant: EMC IP Holding Company LLC, Hopkinton, MA (US)

(72) Inventor: Ivan Martynov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/456,756

(22) Filed: Jun. 28, 2019

(65) Prior Publication Data

US 2020/0410418 A1 Dec. 31, 2020

(51) Int. Cl.

| | |
|---|---|
| ***G06Q 10/06*** | (2023.01) |
| ***G06F 16/2457*** | (2019.01) |
| ***G06F 16/11*** | (2019.01) |
| ***G06Q 10/0631*** | (2023.01) |

(52) U.S. Cl.

CPC ..... *G06Q 10/06312* (2013.01); *G06F 16/113* (2019.01); *G06F 16/122* (2019.01); *G06F 16/24578* (2019.01)

(58) Field of Classification Search

CPC ........... G06Q 30/0629; G06Q 30/0631; G06Q 10/06312; G06Q 30/0206; G06F 16/122; G06F 16/24578; G06F 16/113

USPC ........................................................ 705/7.22

See application file for complete search history.

(56) References Cited

U.S. PATENT DOCUMENTS 9,824,390 B2 * 11/2017 Adapalli ............ G06Q 30/0631
2010/0131624 A1 * 5/2010 Ferris .................... G06F 9/5072 709/221
2010/0332401 A1 * 12/2010 Prahlad ............... H04L 63/0428 705/80
2012/0303740 A1 * 11/2012 Ferris .................... G06F 16/278 709/217
2013/0205007 A1 * 8/2013 Ayachitula ............ G06F 9/5072 709/224
2014/0013318 A1 * 1/2014 Rychikhin ................ G06F 8/71 717/172
2014/0278623 A1 * 9/2014 Martinez ................ G06Q 10/06 705/7.12

(Continued)

OTHER PUBLICATIONS

V. Chang, G. Wills, "A model to compare cloud and non-cloud storage of Big Data," Future Generation Computer Systems vol. 57, pp. 56-76. (Year: 2016).*

*Primary Examiner* — Charles Guiliano
*Assistant Examiner* — Letoria G Knight
(74) *Attorney, Agent, or Firm* — Staniford Tomita LLP

(57) ABSTRACT

Historical activity data about backups and restorations are retrieved. Description files corresponding to cloud storage providers are received. Each description file includes a name of a cloud storage provider, a catalog listing cloud service options offered by the cloud storage provider, and pricing and descriptive information for the options. The historical activity data is mapped to the cloud service options. A set of cost figures is generated based on the mapping. Each cost figure represents a cost that would have been charged to a user, based on the historical activity data, by the cloud storage provider for storing the backups and accessing the backups for the restorations. The cloud storage providers are rated using the cost figures and the rated cloud storage providers are displayed in a user interface to allow the user to select a particular cloud storage provider to which the backups are to be migrated.

20 Claims, 8 Drawing Sheets

(56) References Cited

U.S. PATENT DOCUMENTS

| | | | | |
|---|---|---|---|---|
| 2014/0280848 | A1* | 9/2014 | Modh | H04L 67/10 709/223 |
| 2015/0363851 | A1* | 12/2015 | Stella | H04L 67/14 705/26.41 |
| 2016/0261713 | A1* | 9/2016 | Seago | H04L 47/70 |
| 2016/0321115 | A1* | 11/2016 | Thorpe | G06Q 10/0631 |
| 2018/0137139 | A1* | 5/2018 | Bangalore | G06F 16/2379 |
| 2019/0130313 | A1* | 5/2019 | Patavardhan | G06N 20/00 |
| 2019/0163580 | A1* | 5/2019 | Pandey | G06F 11/1438 |
| 2020/0183794 | A1* | 6/2020 | Dwarampudi | G06F 11/3006 |
| 2020/0195714 | A1* | 6/2020 | Savino | G06F 11/2025 |
| 2020/0257567 | A1* | 8/2020 | Fontanari Filho | G06F 9/45558 |

* cited by examiner

FIG. 5
505
Configuration
Servers
Application Servers
Backup Servers
CA BrightStor ARCserve
CommVault Simpana
EMC Avamar
EMC NetWorker
NetWorker
Backup Client
Backup Device
Backup Group
Backup Pool
Protection Policy
HP DataProtector
IBM Tivoli Storage Manager
Symantec BackupExec
Symantec NetBackup
Symantec PureDisk
VMware vSphere Data Protection
Clustered Servers
DPA Server
Database Servers
DB2
Oracle
PostgreSQL
SAP HANA
SQL Server
Exchange Servers
Storage Management Servers
HP Command View
Solution Enabler Servers
Sun StorageTek ACSLS
Virtualization Servers
VMware
ESX Servers
Virtual Center
Storage
Disk Storage
EMC Data Domain
EMC Disk Library
EMC File Storage
EMC Symmetrix
EMC VNX/CLARiiON
EMC VPLEX
HP Virtual Library System
NetApp NearStore
Node Initiators
Replication
EMC RecoverPoint
EMC RecoverPoint for VMs
Tape Storage
Switches
Sites

ANALYZING CLOUD BACKUP SERVICE OPTIONS USING HISTORICAL DATA PROTECTION ACTIVITIES

TECHNICAL FIELD

The present invention relates generally to information processing systems, and more particularly, to systems and techniques for migrating data to a cloud storage provider.

BACKGROUND

A cloud storage provider is a company that offers enterprises the ability to offload data storage onto a remote storage system in which the provider is responsible for maintaining the storage infrastructure. Enterprise customers may access the data using an internet connection.

There are many benefits to hosting data with a cloud storage provider as compared to the traditional approach of an enterprise storing its data on premise. For example, the cloud storage provider, rather than the enterprise, is generally responsible for server maintenance, updates, cooling, patches, security, and other maintenance tasks.

Choosing and ultimately migrating data to a particular cloud storage provider, however, is not a trivial task. There are many different cloud storage providers. Each cloud storage provider may use different terminology to describe its services, offer different levels or types of cloud services, provide different levels of availability guarantees, host data in different geographical locations, and have different pricing models and pricing structures. As a result, it is very difficult for an organization to assess different cloud storage providers.

There is a need for improved systems and tools to help enterprises evaluate cloud storage options and migrate their data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
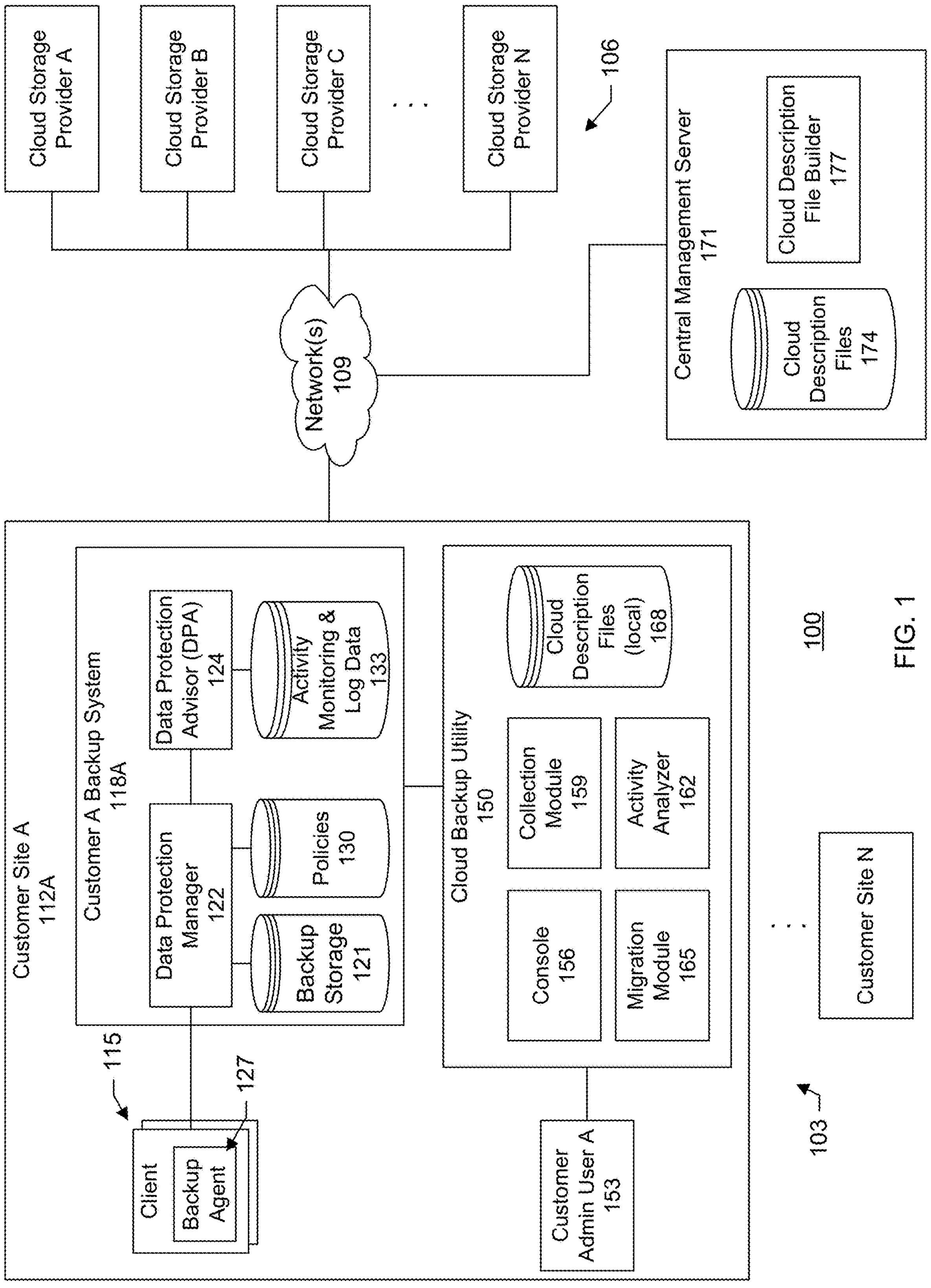
FIG. 1 shows a block diagram of an information processing system for facilitating cloud storage provider assessments and migrations, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for assisting an enterprise user or customer with assessing and evaluating different cloud service providers to which backups of the customer enterprise may be migrated to. In a specific embodiment, a utility is provided that compares and rates cloud backup service options based on the enterprise's prior data protection activities and cloud backup chargeback policies. FIG. 1 shows a block diagram of an information processing system 100 in which one or more embodiments may be implemented. As shown in the example of FIG. 1, customer sites 103 can connect with cloud storage providers 106 via a network 109. A customer site, such as a customer site A 112A, may include any number of client devices 115 connected to a backup system A 118A.

A client may be a physical computing platform having a hardware platform that includes computing components such as a processor, memory, and so forth. Some examples of clients include desktop computers and workstations, servers, database servers, mail servers, file servers, laptops, mobile computing devices such as smartphones, and other types of computing devices. A client may host any number of virtual machines using virtualization software. A virtual machine is a software abstraction of a physical computing machine. A virtual machine is an operating system (OS) or application environment that is installed on software, which imitates dedicated hardware. Virtualization can limit costs by reducing the need for physical hardware systems.

The clients generate and process data. Backup system 118A is responsible for backing up the data. A backup can allow the data to be restored such as in cases where a primary copy of the data has become corrupted or inadvertently deleted. Backup system A 118A includes storage 121 in which backup copies are stored. The storage may include an array of disk drives (e.g., hard-disks or solid state drives), tape, or any other type of storage medium. In an embodiment, backup system 118A may be installed on premise of the enterprise customer or on infrastructure or within a datacenter that is owned or maintained by the enterprise customer. For example, the enterprise customer may be responsible for security, server maintenance, monitoring storage capacity, installing patches, cooling, and so forth.

The backup system may include a data protection manager 122, and a data protection advisor (DPA) 124. The data protection manager is responsible for data backups, data restorations, and data migration (e.g., transferring data from one storage device to another). Specifically, the data protection manager coordinates with backup agents 127 installed at the client machines to backup data from the clients to backup storage and, when required, restore the backed up data from backup storage to the clients or migrate the data. The data protection manager may be referred to as a backup manager.

Backup policies 130 of the data protection manager allow a customer administrative user to specify backup schedules, identify the source to be backed up (e.g., client, volume, folder, file, or application), define retention periods, define the type of backup (e.g., full backup, incremental backup, differential backup, file-based backup, or block-based backup), location or destination of the backup, deduplication settings, and other backup parameters. Such configuration settings may be stored by the data protection manager.

The data protection advisor is responsible for monitoring activity of the data protection manager. The monitoring may include reporting and alerting of the data protection manager and storage. One example of a data protection advisor is the Dell EMC Data Protection Advisor as provided by Dell EMC of Hopkinton, Mass. Some embodiments are described in conjunction with the Dell EMC Data Protection Advisor. It should be appreciated, however, that aspects and principles of the systems and techniques described can be applied to other backup systems and products from other vendors.

The DPA may maintain a log or activity monitoring database 133 about various backup operations and restoration operations that were managed by the data protection manager. The activity database tracks and stores metadata about the backup and restoration operations such as the amount or size of data backed up, time and date of a backup, amount of data requested for restore operations, time and date of a restoration, retention period (e.g., time and date that a backup should be kept, or time and date a backup was deleted), amount of data transferred from the clients to the data protection manager (e.g., backup size), amount of data transferred from the data protection manager to the clients (e.g., restoration size), a count of a number of clients backed up, location of the backups, number of files backed up, number of files restored, type of data or service backed up, type of database backed up, identification of sources to backup (e.g., source volume, source folder, source file, or source application), and other historical activity or configuration data.

Cloud service providers are third-party companies that offer, among other things, cloud or remote storage. With a cloud provider, an enterprise does not have to build and maintain its own infrastructure. Instead, services such as storage can be purchased as-needed from a particular cloud service provider. There are many different cloud service providers, each of which may offer different services, pricing structures, performance, service guarantees, service tiers, integration, support, utilities, tools, security, storage levels, storage types, transfer speeds, and other options. Some specific examples of cloud service providers include Amazon (e.g., Amazon Web Services (AWS)), Microsoft (e.g., Azure), Google (e.g., Google Cloud), and others. It can be a very difficult and time-consuming process for a customer to evaluate, select, and ultimately migrate backups to a particular cloud service provider because of the plethora of cloud service providers and bewildering number of service offerings.

Cloud backup technology (which may be referred to as online backup) continues to gain attraction. Cloud backup includes backing up data by sending a copy of the data over a proprietary or public network to an off-site or on-site server. The cloud server is hosted by a third-party service provider in cases of a public cloud or in the corporate IT department in cases of a private cloud service. The service provider charges the customer a fee based on usage such as storage usage, type of storage used, geographical location of data storage, level of performance desired, data transfer amounts, number of users, number of concurrent users, number of operations, or other criteria. Even in cases where the enterprise has the off-site server owned by the company, the chargeback method can be the same.

The number of online backup service providers along with the number of services that they offer is constantly growing. Also, these same service providers typically have a wide variety of backup services with different costs, payment options, and pricing structures depending on different technical characteristics of backups and other factors. For example, pricing can vary widely depending upon a customer's geographical location. The recent trend in backup systems is on premise clouds such as those provided by Dell EMC.

Many cloud provider companies are competing for cloud storages business by offering a deluge of service options that affect pricing and service delivery. So, finding the service that best aligns with a customer's business requirements and pricing is becoming a non-trivial task. There is a need to provide customer consulting involving cloud advisory services to help customers with cloud backup infrastructure.

Sometimes customers want to have some preliminary analysis performed of what will they get if they include cloud backup options into their environment. Typically, pricing or cost is one of the most important factors when deciding which cloud service provider to select. Additional factors that add complexity in choosing are that online backup providers often change charge rates and that it is desirable to consider multiple other different factors (such as geo-location of the cloud, retention period of the data, and other factors). As for private clouds, there are also many variants on how to implement them and accordingly there are also a variety of chargeback policies. Prior to choosing the storage plan, the customer often has to collect and study many descriptions of cloud backup storage options from lots of different sources (usually web sites) and then apply this information to obtain the chargeback information.

There is a need to help customers of backup systems who are planning to use a cloud based service to choose the most favorable services and chargeback options based on an analysis of the customers' prior backup and restore information. Such information may be collected by a customer's existing backup system. The information can then be used to calculate chargeback for different cloud backup storage variants. In a specific embodiment, there is an existing backup system that stores information about a customer's backup and restoration that may include, for example, data volumes, backup periodicity, types of backups and backup applications, and other details concerning backup and restoration operations. There is a need to provide a customer with a rating of various cloud storage plans which aligns with a customer's current backup and infrastructure parameters, such as retention policy, client number, data volume, and others which may be derived from the customer's existing backup management server.

Customers may also be concerned with constant backup data volume growth. It is desirable that backup plans be chosen taking into account the trend in backup data growth.

In a specific embodiment, systems and techniques are provided to customers of a backup system in which accumulated information about previous backups and other previous activity (e.g., restoration or migration operations) are used to suggest to a customer a list of online backup plans, optimized for the customer's specific case. A report is generated that allows the customer to take a deep look at the pricing and functionality of each cloud backup vendor and each backup option available. In a specific embodiment, systems and techniques allow customers planning to use or change to cloud backups the ability to compare different cloud backup storage options which are applied to the current backup infrastructure. In a specific embodiment, systems and techniques are provided to allow customers to familiarize themselves with specific cloud backup solutions and promote such cloud backup solutions and affiliated partners.

In a specific embodiment, a module or utility is provided that compares cloud backup services options using the information collected by a data protection advisor from the customer's environment and information describing cloud backup options (including chargeback information) to provide a comparative report of different cloud backup services and variants. In a specific embodiment, the module builds a visual model of a cloud backup structure in a user interface (UI) and compares parameters of different cloud backup storage plans according to parameters, settings, and corresponding values stored by the data protection advisor as a result of its monitoring. The module may generate table reports comparing and ranking various cloud backup services based on the customer's own historical activity concerning backup and restoration operations.

In a specific embodiment, the information about backup and restoration activity in the customer's environment is used as a prototype, model, guide, pattern, or template of planned backup and restoration activity to facilitate a migration to a cloud backup or cloud backup service. Parameters of previous or past backup and restoration activities in the customer's environment can be used as the input parameters of a pricing calculation for planned cloud backups.

For example, backup jobs occurring in the customer's on premise environment include parameters tracked in a DPA database such as "amount of data backed up (Mb)" and "retention days." In a specific embodiment, these values are used as values of backed up data and retention days in the planned cloud backup infrastructure. In a specific embodiment, the module or utility considers a set of such source parameters to decide and make recommendations about which cloud storage to use, what retention period to set, what storage to use to migrate the data after retention period expires, determine a period after which backed up data is expired and can be deleted, and other settings of the cloud backup service that the customer has chosen to use.

In a specific embodiment, a user interface (UI) is provided that allows the customer to select one or more data sources (backup storages, applications, and so forth) from the customer's infrastructure to model a structure of cloud backup and compare results regarding how cloud backup can be implemented by different cloud backup providers.

Referring now to FIG. 1, in a specific embodiment, the information processing system includes a cloud backup utility or tool 150. This utility allows a user 153, such as an administrator of the enterprise customer, to evaluate and compare different cloud storage providers using past backup and restoration operations managed by a backup system of the customer enterprise. The results of the evaluation are provided by reports on a computer display. The reports can be interactive so that the user is able to drill down (e.g., use a mouse or other pointing device to point and click a graphical element or control) to see details about a particular cloud storage provider.

As shown in the example of FIG. 1, the cloud backup utility includes several modules and some databases or repositories. These modules can be implemented using software code, or in hardware, such as by firmware, or a combination of software and hardware. Some specific modules are shown, but a system may include a subset of the modules shown or additionally other modules not shown. Some modules may be combined with other modules shown or different modules. For example, in a specific embodiment, the utility may be integrated with the data protection advisor or data protection manager. In another specific embodiment, the utility may be provided as a standalone program that is separate from the data protection advisor, data protection manager, or both.

In a specific embodiment, the cloud backup utility includes a console 156, a collection module 159, an activity analyzer 162, a migration module 165, and a cloud description database or repository 168.

The console acts as an interface for the utility and provides a user interface for selecting options, inputting parameters and values, and viewing reports.

The collection module is responsible for obtaining past activity data from the data protection advisor about backup and restoration operations conducted by the data protection manager and monitored by the data protection advisor; and obtaining backup system configuration. The activity data may be stored in a database, log files, or both. The activity or configuration data may include metadata about the backup and restoration operations. For example, the activity or configuration data may include a time and date of a backup job (e.g., starting time and date of the backup job, and ending time and date of a backup job), a size or an amount of data backed up during the backup job, a type of storage device that the backed up data was written to, a location of the backup storage device, source clients from which the data was backed up from, a type of backup, a time and date of a restore (e.g., starting time and date of the restore, and ending time and date of the restore), a size or an amount of data restored, location to which the backed up data was restored, time and date that access to a backup was requested, amount of data transferred during the access request, backup schedules, retention durations, and other parameters of the backup and restore operations.

The cloud description database or repository stores a set of description files that describe the various cloud storage providers. A cloud description file for a cloud storage provider may include information such as a name of the cloud storage provider (e.g., Amazon AWS), a catalog listing cloud services offered by the cloud storage provider, a price or pricing structure for the cloud services, performance guarantees, available geographical location options for storing data, types of storage available (e.g., solid state drives, hard drives, or tape), long-term storage or archiving options, levels of service available, other details including other descriptive information, or combinations of these. In other words, a cloud description file for a cloud provider models the cloud services and their associated costs offered by the cloud provider. A cloud description file may include various unit prices for various services provided by the cloud provider.

For example, a first cloud description file for a first cloud storage provider may include a first unit price charged by the first cloud storage provider for data storage, and a second unit price charged by the first cloud storage provider for processing operations. A second cloud description file for a second cloud storage provider, different from the first cloud storage provider, may include a third unit price charged by the second cloud storage provider for the data storage, and a fourth unit price charged by the second cloud storage provider for the processing of the operations.

In a specific embodiment, the cloud description files are generated at a central management server 171 and distributed from a central repository 174 of the management server to each of the various customers of the backup system (or cloud backup utility). The management server may include a cloud description file builder 177 that is responsible for creating the various cloud description files of the various cloud storage providers. In a specific embodiment, the cloud description file builder includes a parsing engine that parses a website of a cloud storage provider to obtain details such as a listing of cloud services offered by the cloud storage provider, storage options, pricing structure for the cloud services, pricing rates, unit prices, and other details.

In another specific embodiment, the cloud description files may be generated manually such as by a human that reviews the website of the cloud storage provider. Updates to the cloud description files may be distributed as-needed to the backup systems or cloud backup utilities at the various customer sites. The cloud description files may be downloaded (automatically or manually) to the data protection advisor for the cloud backup utility.

For example, a cloud storage provider may make changes to its pricing. A respective cloud description file may be updated to include the updated pricing. The updated cloud description file may then be distributed to the cloud backup utility so that the cloud backup utility has the updated pricing.

The activity analyzer is responsible for correlating or mapping the past activity data about the backup and restore operations to each of the different cloud storage provider description files corresponding to the different cloud storage providers. The activity analyzer uses the mapping or correlation to generate a set of cost figures representing the different costs that would have been charged to the customer had the customer been using a cloud storage provider. That is, in a specific embodiment, the activity analyzer backtests each of the different cloud storage providers using the past historical backup and restoration activity data of the enterprise in order to assess and evaluate each of the different cloud storage providers.

In a specific embodiment, the cost figures may be provided as a monthly cost. For example, a customer's historical activity data may reveal that a total size of the customer's stored backups are 550 terabytes (TB). A first cloud description file for a first cloud storage provider may specify that the first cloud storage provider charges a first unit price of $0.021 per gigabyte (GB) of data stored per month. A second cloud description file for a second cloud storage provider, different from the first cloud storage provider, may specify that the second cloud storage provider charges a second unit price of $0.025 per GB of data stored per month. The activity analyzer maps or correlates the 550 TB value to the first and second unit prices to calculate a first cost figure of $11,550 per month storage charge for the first cloud storage provider (550,000 GB×$0.021=$11,550) and a second cost figure of $13,750 per month storage charge for the second cloud storage provider (550,000 GB×$0.025=$13,750). These cost figures may be used to help rate or rank the various cloud storage providers. A report may be generated that displays the cost figures.

As another example, the customer's historical activity data may reveal that for a particular month 35 TBs of data was transferred out from backup storage. The first cloud description file may specify that the first cloud storage provider charges a third unit price of $0.085 per GB per month for transferring data out from the first cloud storage provider. The second cloud description file may specify that the second cloud storage provider charges a fourth unit price of $0.083 per GB per month for transferring data out from the second cloud storage provider. The activity analyzer maps or correlates the 35 TB value to the third and fourth unit prices to calculate a third cost figure of $29,750 per month data transfer out access charge for the first cloud storage provider (350,000 GB×$0.085=$29,750) and a fourth cost figure of $29,050 per month data transfer out access charge for the second cloud storage provider (350,000 GB×$0.083=$29,050). Costs may instead or additionally be reported as weekly costs, yearly costs, or by any other time period as desired.

In a specific embodiment, the utility allows the user to select a particular cloud storage provider to which past backups may be automatically migrated to. The utility may include migration module 165 which may include a set of application programming interfaces (APIs) that interface or communicate with a respective cloud storage provider. For example, there can be a first API for communicating with a first cloud storage provider. There can be second API for communicating with a second cloud storage provider, different from the first cloud storage provider. The cloud backup utility invokes the proper API depending on which cloud storage provider the user decides to use. The cloud backup utility may then migrate past backups from the customer site to the selected cloud storage provider. Once the past backups have been migrated, the past backups may be deleted from the customer site.

In an embodiment, the cloud backup utility, via an API for the selected cloud storage provider, may further automatically set or transfer configuration options at the selected cloud storage provider based on the information stored at the customer user's enterprise backup system. Such information may include configuration information, data retention policy information, storage type, and other information. For example, the DPA or other backup configuration database may specify or have information indicating a particular retention duration for backups. The utility can issue a command via the API to set a data retention parameter at the selected cloud storage provider to have the same particular retention duration.

As another example, the DPA or other backup configuration database may specify a data lifecycle in which data is moved or migrated from a first type of storage to a second type of storage, different from the first type of storage. For example, as the data ages and time passes, the data may be moved from storage offering high performance but at a high cost to storage offering lower performance but at a lower cost. The utility can issue a command via the API to set data lifecycle options (e.g., data aging parameters) at the selected cloud storage provider.

In FIG. 1, the cloud backup utility is shown residing at the customer site. In another specific embodiment, the cloud backup utility may reside at the central management server. In this specific embodiment, the historical activity data and configuration information stored in the DPA database may be transmitted over the network to the central management server for analysis.

Figure 2:
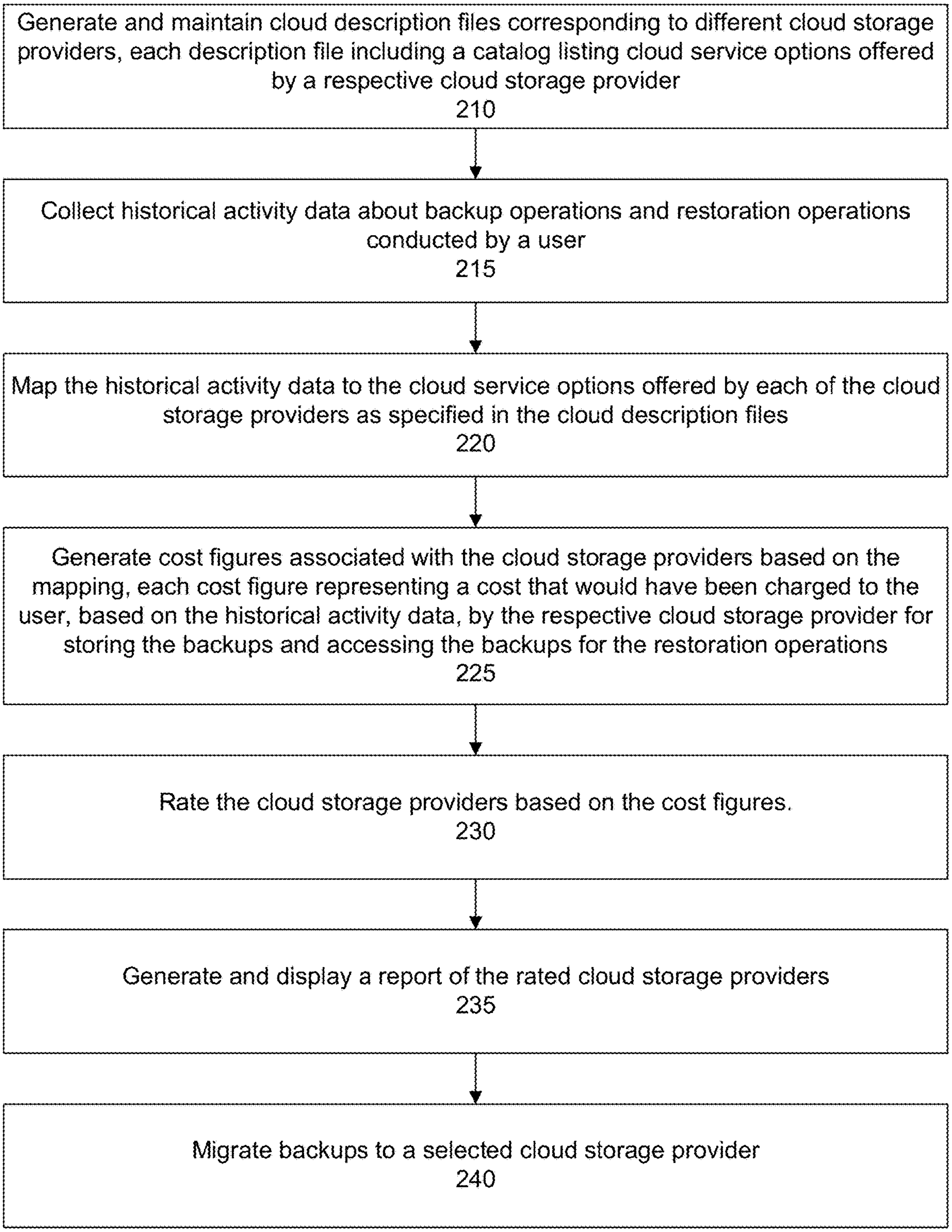
FIG. 2 shows an overall flow of a cloud backup utility, according to one or more embodiments.

FIG. 2 shows an overall flow of the cloud backup utility according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, cloud description files corresponding to different cloud storage providers are generated and maintained. Each description file includes a catalog listing cloud service options offered by a respective cloud storage provider. A catalog includes pricing information including unit prices for cloud services offered by a respective cloud storage provider. A description file may include quantitative information such as unit pricing information for storage, services, operations, and access. A description file may include qualitative information such as a textual description of the respective cloud storage provider.

A first description file for a first cloud storage provider may be different from a second description file for a second cloud storage provider because the cloud storage providers may charge different prices for their cloud services. For example, the first cloud storage provider may charge a first unit price for data storage. The second cloud storage provider may charge a second unit price for data storage, different from the first unit price. The first cloud storage provider may charge a third unit price for particular data operations. The second cloud storage provider may charge a fourth unit price for the particular data operations, different from the third unit price.

Different cloud storage providers may have different pricing tiers. For example, the first cloud storage provider may charge a fifth unit price for storing an amount of data falling within a first range, and a sixth unit price, different from the fifth unit price, for storing an amount of data falling within a second range. The second cloud storage provider may charge a seventh unit price for storing an amount of data falling within a third range, and an eighth unit price, different from the seventh unit price, for storing an amount of data falling within a fourth range.

In a step 215, historical activity data about backup and restoration operations conducted by a customer user and monitored by the data protection advisor is collected. As discussed, such historical data may include an amount or size of backup data stored during a particular time period, amount of data transferred between a source of a backup (e.g., source client or volume) and destination (e.g., backup storage), amount data transferred during restoration operations, number of access requests to the backups, retention durations, and other data or metadata.

In a step 220, the historical activity data is mapped or correlated to the cloud service options offered by each of the cloud storage providers as specified in the cloud description files. The cloud backup utility includes logic to map or correlate a particular parameter value obtained from the historical activity data to a corresponding cloud service (and respective unit price) specified in a cloud description file. For example, a parameter value identifying an amount of backup data in storage may be mapped to a first unit price charged by a first cloud storage provider for data storage. The parameter value may be mapped to a second unit price charged by a second cloud storage provider for the data storage.

The cloud backup utility includes logic to map or correlate a particular parameter value to an appropriate pricing tier of a cloud storage provider. For example, a first cloud storage provider may have a first unit price for storing an amount of data falling within a first range, and a second unit price, different from the first unit price, for storing an amount of data falling within a second range. The cloud backup utility can examine and compare the particular parameter value against the first and second ranges to determine whether the particular parameter value should be mapped to the first unit price (i.e., when the particular parameter value falls between the first range) or mapped to the second unit price (i.e., when the particular parameter value falls between the second range).

It can be very difficult for a customer to determine which cloud storage provider best suits their needs because different cloud storage providers use different terminology, have different pricing models, different pricing structures, frequently change prices, and have different options. The cloud backup utility, in conjunction with the various cloud description files for the various cloud storage providers, facilitates assessing and evaluating different cloud storage providers because the utility maps a particular parameter to a corresponding cloud service of different cloud storage providers.

In a step 225, cost figures associated with the cloud storage providers are generated based on the mapping or correlation. Each cost figure represents a cost that would have been charged to the customer user, based on the historical activity data, by the respective cloud storage provider for storing the backups and accessing the backups for the restoration operations.

In a step 230, the cloud storage providers are rated, ranked, or scored based at least in part on the cost figures. While cost is often a key criteria in the decision-making process, the utility allows the customer user to prioritize the various criteria used to score the cloud storage providers. For example, the customer may also value other characteristics such as customer support, documentation, level of customization, payment options or payment models (e.g., pay-as-you-go versus long-term contracts), supported platforms and databases, available tools (e.g., analytical tools, management tools, or developer tools), geographical location of the data center, security controls, availability, ease of migration (e.g., ease at which data may be migrated from the enterprise to the cloud storage provider or ease at which data may be migrated from the cloud storage provider to a different cloud storage provider), and other quantitative and qualitative characteristics. In a specific embodiment, the utility includes a scoring algorithm that allows the user to weight the different characteristics used by the algorithm. The scoring algorithm allows the user to weight the importance of a particular characteristic (e.g., cost) relative to other characteristics (e.g., customer support or documentation).

In a specific embodiment, the utility prompts the user to input weights to assign to the various criteria used by the utility to rate the different cloud storage providers. For example, the user may assign a first weight to cost or price. The user may assign a second weight to customer support. The user may assign a third weight to documentation, and so forth. These weights are used to calculate weighted averages according to which the cloud storage providers are scored.

The weighted average capability of the utility allows different users to assign their own relative importance to the criteria or characteristics used to score the cloud storage providers. For example, some enterprise customers may place a greater importance on cost as compared to other enterprise customers. Some enterprise customers may place a greater importance on customer support as compared to other enterprise customers. Some enterprise customers may place a greater importance on documentation as compared to other enterprise customers. The utility can provide assessments and evaluations of different cloud storage providers that are specifically tailored to the particular needs of a particular enterprise customer. Thus, while the same scoring algorithm or function may be applied across different enterprise customers, each enterprise customer can assign their own specific weighting values to the criteria used by the scoring algorithm.

In a step 235, a report of the rated cloud storage providers is generated and displayed. The user may review the report and select a cloud storage provider. The report may display the cloud storage providers in a table or grid format. The report may be generated by retrieving from the cloud description files the names and other descriptive information about the cloud storage providers. The scores assigned to the cloud storage providers by the analyzer may be used to determine the order in which the cloud storage providers are listed or displayed in the report. For example, a cloud storage provider having a score higher than another cloud storage provider may be displayed in the report above the other cloud storage provider.

In a step 240, backups are migrated from the customer site to the selected cloud storage provider. In a specific embodiment, the report further details one or more migration modules that are available to facilitate migration to a particular cloud storage provider. For example, in some cases the data protection manager currently installed at the customer site may not have the capability to backup to a cloud.

In a specific embodiment, the cloud backup utility reviews details about the installed data protection manager such as the version information and the cloud storage provider the customer has selected in order to identify the relevant migration modules that can be used to enable backups to the selected cloud storage provider. A migration module may be specific to a particular cloud storage provider as different cloud storage providers may expose different APIs. In a specific embodiment, there is an index listing various versions of the data protection manager and corresponding migration modules associated with different cloud storage providers. The utility can review the index to cross reference and identify the one or more modules that the customer may require in order to enable backups to the selected cloud storage provider. The appropriate migration module is then downloaded to and installed at the customer site by the cloud backup utility. The migration module includes the appropriate logic to interface and communicate with the API of cloud storage provider that the customer user has elected to use.

Figure 3:
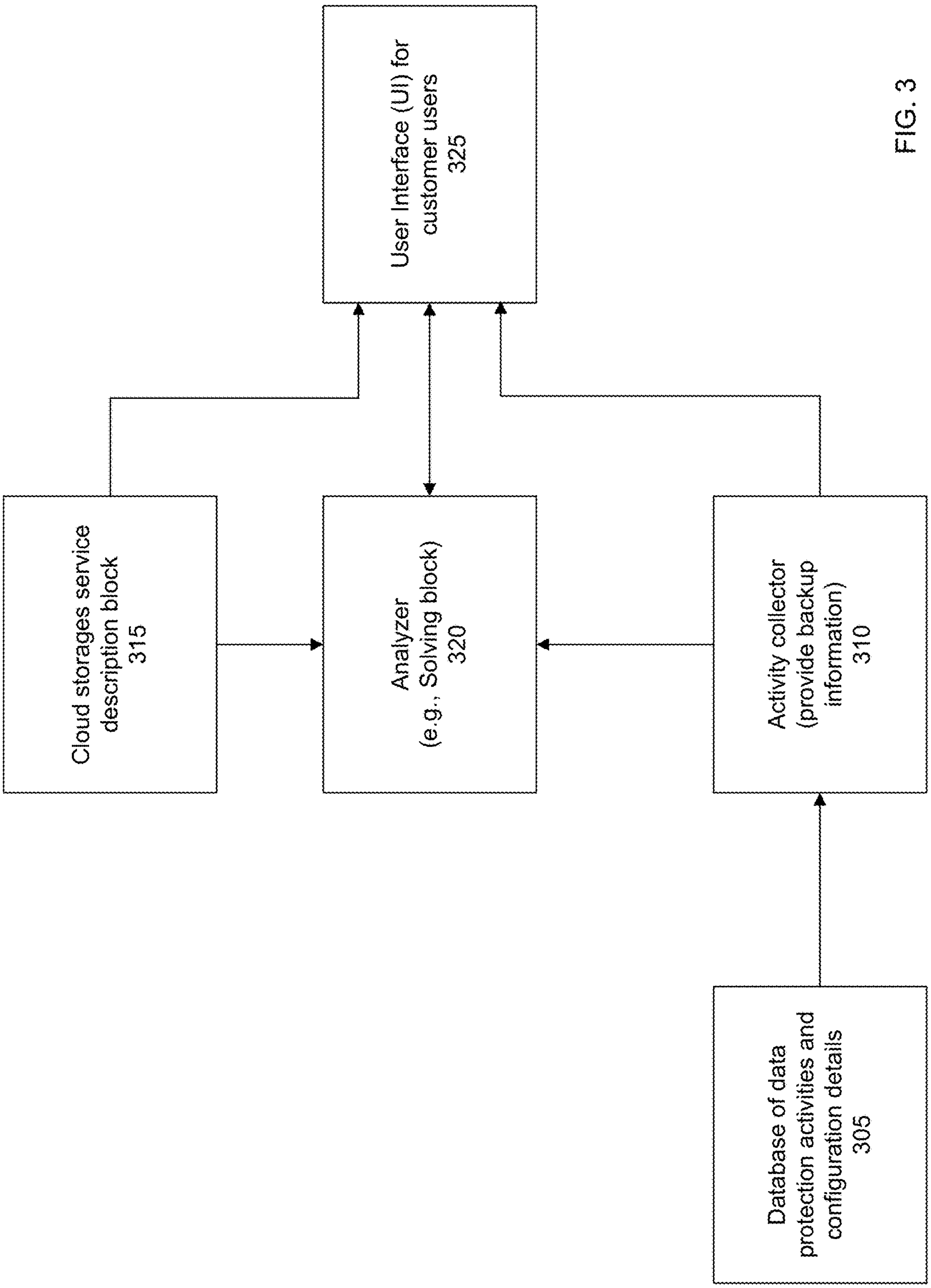
FIG. 3 shows a schema of some functional blocks and interactions of the utility, according to one or more embodiments.

FIG. 3 shows a schema of some functional blocks and interactions of a cloud utility for evaluating cloud storage services according to one or more embodiments. As shown in the example of FIG. 3, there is a database of data protection activities 305, an activity collector or module 310, a cloud storages service description block 315, an analyzer or solving module 320, and a user interface 325.

The activity collector receives information about past backup and restoration operations from a data protection advisor database and provides the information to the analyzer. The information can also be displayed in the user interface.

In a specific embodiment, the DPA database contains information about backup and restore operations, storages and backup application configuration associated with the customer's infrastructure. In a specific embodiment, the information is stored in a Postgres database. It should be appreciated, however, that other types of databases may instead or additionally be used (e.g., Oracle® database). In a specific embodiment, the information is accessed via the backup manager through an option "data sources"-views, connected to the database.

This information may be collected by the DPA as part of automated monitoring and analysis across backup and recovery infrastructure, replication technologies, storage platforms, enterprise applications and virtual environment. In a specific embodiment, a DPA request referred to as "jobmonitor" collects the information about backup and restore jobs that were performed in the current backup infrastructure. The collected information includes details about backups operations, restoration operations, cloning operations, data migration operations, and other types of operations in the environment. In a specific embodiment, all backup and restoration jobs are reflected, logged, or recorded in the DPA database and information about such jobs is used as a source for further calculations. In a specific embodiment, the collector issues a request to the DPA to gather the details.

In a specific embodiment, there are two DPA data sources that the utility uses. The first DPA data source may be referred to as the "backup all jobs" data source. The second DPA data source may be referred to as the "restore details" data source.

Table A below shows some fields from the "backup all jobs" data source.

TABLE A

| Field | Description |
|---|---|
| Size | Amount of data backed up (in MB) |
| Server | Name of the backup server on which the Job took place |
| Status Code | Status code of the job from the backup application |
| Throughput | Throughput of size to duration (MB/sec) |
| Size Transferred | Total size of the data transferred (in MB) |
| Client | Name of the client backed up |
| Started | Time the backup went into the backup applications started |
| Finished | Time the backup went into the backup applications ended |
| Retention | Number of days to retain |
| Expires | Date that a Job will expire |
| Group | Name of the group or policy in which the Job took place |
| Schedule | Name of the schedule under which the Job ran |
| Domain Name | Name of the domain |
| Storage Unit | Storage unit the policy is configured to use |
| Action | Name of the action |
| Policy | Name of the protection policy |
| Job | Name of the Job backed up |
| Backup Set | Name of the backup set associated with the job |
| App Type | Name of the TDP that was used to perform the backup |
| Status | Status of the Job backed up: Success, Failed, Missed |
| Level | Level of the Job backed up: Full, Incremental, User, Manual, Cumulative Incremental, Differential Incremental, 1-9 |
| Size Scanned | Total size of the data scanned before deduplication (in MB) |
| Files | Number of files backed up |
| Files Scanned | Number of files scanned |
| Duration | Time the backup application took to complete the job |
| Pool | Backup pool in which the backup Job belongs |
| Number of Copies | Number of inline copies, if any |
| Number of Secondary Copies | Total number of secondary copies taken, if any |
| Compliant | Indicates if the backup job is compliant with the data protection policy |
| Policy Used | Indicates if a data protection policy applies to this backup job |
| Total Reduction Ratio | Total percentage of data compressed and deduplicated |
| Deduplication Reduction | Total percentage of data deduplicated |
| Num Objects Deduplicated | Number of backup objects deduplicated |

Table B below shows some fields from the "restore details" data source.

TABLE B

| Field | Description |
|---|---|
| Server | Name of the backup server on which the restore took place |
| Media Server | Name of the Media Server to which the Job was backed up |
| Client | Name of the client being restored |
| Err Code | Error code associated with the restore |
| Size | Amount of data restored (in MB) |
| Num Files | Number of files restored |
| Backup Number | Number of the backup that is being restored |
| Number Of Files | Number of files restored |
| Started | Time the restore started reading |
| Finished | Time the restore completed |
| Job | Name of the Job being restored |
| Domain Name | Name of the domain associated with the group |
| Owner | Owner of the restore job |
| Status | Status of the restore: Success, Failed, Missed (TSM only) |
| Err Code | Error code associated with the restore |
| Size Scanned | Total size of the data scanned (in MB) |
| Backup Time | Time at which the data being restored was originally backed up |
| Backup Label | Name of the backup that is being restored |
| Scanned | Size of the scanned and compressed file (in MB) |
| Backup Application | Name of the backup application on which the restore occurred |
| Started | Time the restore started reading |
| Finished | Time the restore completed |

Figure 4:
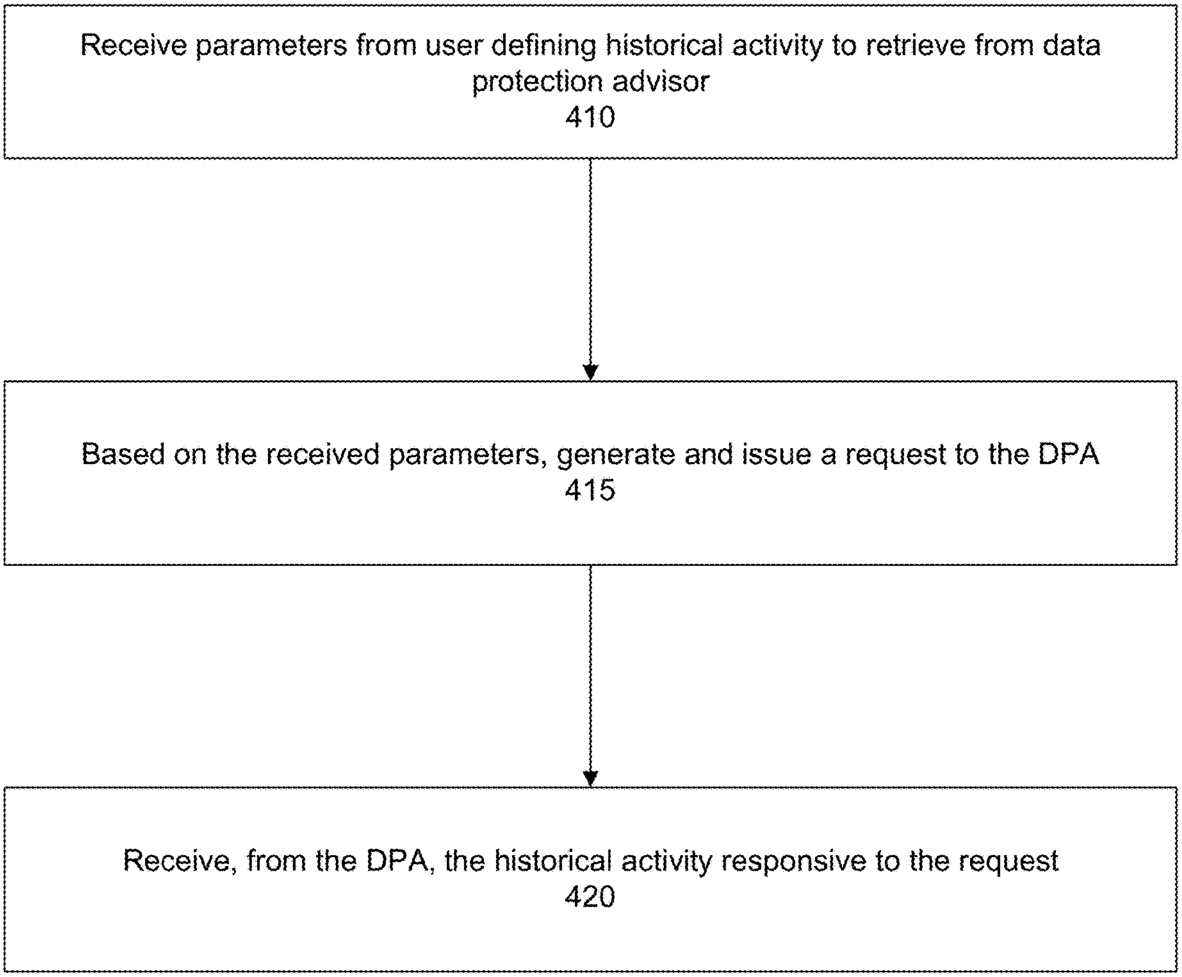
FIG. 4 shows a flow for collecting activity and configuration, according to one or more embodiments.

FIG. 4 shows further detail of a flow for collecting historical activity data. In a step 410, the cloud backup utility or, more particularly, the activity collection module of the utility receives parameters from a user that define the data (e.g., historical activity data) to retrieve from the data protection advisor. In a specific embodiment, the parameters include a time period, scope, request type, logical conditions, or combinations of these.

The time period parameter allows the user to specify a starting and ending date and time. For example, the user may specify activity from the past month, past two months, past six months, past year, one or more particular months within the past year, or any other time period that the user desires. Being able to select an activity period allows the user to exclude periods of unusual activity and ensure that the selected activity period is an accurate representation of backup and restoration activity.

Figure 5:
FIG. 5 shows a screenshot of an interface for selecting source scope for assessment against cloud storage providers, according to one or more embodiments.

The scope parameter allows the user to specify the extent of the backup configuration to be analyzed against the cloud storage providers. In a specific embodiment, the utility displays the configuration of the backup system as a tree having selectable leaves. FIG. 5 shows an example of a configuration tree 505. The configuration tree may identify sets of servers, storages, applications, backup applications monitored by the DPA, or combinations of these that are suitable for backup to a cloud storage provider. That is, in a specific embodiment, the components of the customer users' compute environment that are suitable for cloud backup are presented as a tree of elements, each of which can be selected so that all its descendants also become selected. A whole configuration can be selected by a root node. Leaves of the tree are dependent on a server or application (for example "backup clients" for backup applications, "backup pools," "protection policy"). The utility may filter components or items of the environment that are not suitable or subject to cloud backups so that such components or items are omitted from the configuration tree. In some cases, a user may wish to exclude source data from being stored in the cloud. For example, the source data may be particularly sensitive such that the enterprise wishes to control all aspects of its storage.

The activity collection module is aware of peculiar properties of different data protection solutions used by the customer in terms of obtaining the necessary information about different data protection actions (number of operations or amount of data). So, the activity collection module can calculate the number of operations or amount of data from the necessary fields of DPA data sources, which can be specific for each data protection solution.

The logical conditions parameter allows the user to specify Structured Query Language (SQL) statements, and more particularly, a WHERE clause to restrict or filter the historical activity data that is returned. The WHERE clause may specify any fields shown in tables A and B above and specify logical operators such as AND and OR, comparison operators such as "=," or other operator, or combination of operators.

The request type parameter allows the user to specify whether to receive a detailed level of historical activity data or a summarized level of historical activity data.

In a step 415, based on the parameters received from the user, the cloud backup utility generates and issues a request to the data protection advisor for the historical activity data. In a step 420, the historical activity data responsive to the request is received.

As discussed, the information can be detailed or summarized. In a specific embodiment, the information is received as a collection of one or more records. There can be records detailing backup operations (i.e., "backup" records), records detailing restoration operations (i.e., "restore" records), or both.

Table C below shows fields that may be included in a summarized variant of the backup records.

TABLE C

| Field | Description |
|---|---|
| Backup type | Specifies the type of backup performed (e.g., full backup, incremental backup, differential backup, snapshots, virtual machine (VM) backup, archive, or migration). |
| Count | Count of backup operations |
| Size | Total amount of data backed up (in MB) |
| Size Transferred | Total size of the data transferred (in MB) |
| Retention | Retention days |

The information may be grouped by, for example, the "backup type" and "retention" fields. Other fields such as "count," "size," and "size transferred" may be summarized or totaled to display absolute values. In a detailed variant, the set of included fields (and accompanying values) may be as shown in table A above (e.g., fields in the "backup all jobs" DPA data source). The "backup" request can return no records, or one or more records.

Table D below shows fields that may be included in a summarized variant of the restore records.

TABLE D

| Field | Description |
|---|---|
| Count | Count of restore operations |
| Size | Total size of the data restored (in MB) |
| Size Transferred | Total size of the data transferred (in MB) |
| Number Of Files | Number of files restored |

The "restore" request can return no records, or one or more records. In a detailed variant, the set of included fields (and accompanying values) may be as shown in table B above (e.g., fields in the "restore details" DPA data source). The "restore" request can return no records, or one or more records.

The cloud storages service description block provides information about the structure, parameters and pricing of different cloud storage providers to the user interface and analyzer (e.g., solving block). Cloud storages service description block includes cloud description files for the various different cloud storage provides. A cloud description file includes a structured format in which a respective cloud storage provider is described. The structured format allows for modeling and describing a cloud storage structure of the respective cloud storage provider including its parameters, names, textual description, and how the prices for the various services offered by the respective cloud storage provider are calculated. A cloud description file provides for a universal description or template of any available cloud storage including on premise cloud storage providers and off premise cloud storage providers. In a specific embodiment, the source information in the cloud description files are stored in stored in Extensible Markup Language (XML) formatted files.

Different cloud storage providers have their own set of parameters. Parameters can be logically attributed to or be used to capture the descriptions and features offered by a cloud storage provider, the data protection and pricing capabilities (represented by inner units) offered by the cloud storage provider, or both.

The following tables show some examples of parameters associated with cloud storage providers that may be captured in the cloud description files. It should be appreciated that these parameters are presented for purposes of example. There can be other parameters or different parameters specified in a particular cloud description file of a particular cloud storage provider.

In a specific embodiment, the cloud description files include three types of parameters or data to represent the cloud storage providers. A first type includes numeric parameters. Numeric parameters are comparable (e.g., a numeric parameter of a first cloud storage provider can be compared to a corresponding numeric parameter of a second cloud storage provider, different from the first cloud storage provider). A second type includes logical parameters with values of yes/no. Logical parameters are comparable (e.g., a logical parameter of a first cloud storage provider can be compared to a corresponding logical parameter of a second cloud storage provider, different from the first cloud storage provider). A third type includes non-comparable textual parameters. Non-comparable textual parameters may be in the form of name/value text strings.

Table E below shows some examples of numeric parameters.

TABLE E

| Name | Unit | Type of variable | Comment |
|---|---|---|---|
| Data durability | Percentage | Percentage | Durability refers to long-term data protection, e.g., the stored data does not suffer from bit rot, degradation or other corruption. |

TABLE E-continued

| Name | Unit | Type of variable | Comment |
|---|---|---|---|
| Designed for availability | Percentage | Percentage | Availability refers to system uptime, e.g., the storage system is operational and can deliver data upon request. |
| Availability SLA | Percentage | Percentage | Availability in service level agreement (SLA) |
| Availability SLA for read requests | Percentage | Percentage | |
| Availability SLA for write requests | Percentage | Percentage | |
| Retrieval time | Minutes | Linear (decreasing) | It is usually used for long-term storages (for virtual tapes) which take time to prepare data for restoring |
| Throughput performance | MiB/sec | Linear (growing) | |
| Long-term retention period | Years | Linear (growing) | Long-term retention of data, e.g., data that will be retained for 7-10 years. |
| Number of availability zones | Number | Linear (growing) | |
| First byte latency | milliseconds | Linear (decreasing) | |
| Maximum storage account capacity | TB | Linear (growing) | |
| Maximum request rate per storage account | Number | Linear (growing) | |
| Maximum ingress per storage account | MiB/s | Linear (growing) | |
| Maximum egress per storage account | MiB/s | Linear (growing) | |
| Max provisioned size | TiB | Linear (growing) | |
| IOPS | Number | Linear (growing) | |

Table F below shows some examples of logical parameters.

TABLE F

| Name | Comment |
|---|---|
| Encryption | Supports Secure Sockets Layer (SSL) (or other cryptographic algorithms) for data in transit and encryption of data at rest |
| Lifecycle management | Lifecycle management for automatic migration of objects to other storage classes |
| Security features | Security features to block unauthorized users from accessing private data |
| Configurable retrieval times | Configurable retrieval times, from minutes to hours |
| Storage management | Storage control capability |
| Storage monitoring | Features to monitor and control how resources are being used. |
| Access management and security | Features to control access to the data (e.g., create users and manage their respective access; audit users' activities) |

TABLE F-continued

| Name | Comment |
|---|---|
| Transferring large amounts of data | Services that work by using secure physical devices to transport data via roads and solve for migration problems such as high network costs, long transfer times, and security. |
| Resilient against node unavailability within a data center | |
| Resilient against entire zone outage | Resilient against events that impact an entire geographical zone |
| Resilient against a region-wide outage | |
| Read access to data in the event of region-wide unavailability scenario | In a remote, geo-replicated region |
| Retrieval fee | * used in comparing formula with negative value, as it is logical to think that a positive value of the option is undesirable |

Table G below shows some examples of textual parameters.

TABLE G

| Name | Description |
|---|---|
| Storage control options | Ability manage data: copy, remove, modify access controls, restore archived data through some management, move to different layer, replicate |
| Storage monitoring description | |
| Security features description | Security features to block unauthorized users from accessing your data, (e.g., VPN endpoints, server-side encryption) |

Each characteristic of a cloud storage provider to capture can be added to a respective cloud description file (xml file) using the following format:

```
<parameter name="Name of the parameter" value="value" unit="unit type"/>
```

Below are some examples of parameters and corresponding values that may be included in a cloud description file.

```
<parameter name="Data durability" value="99.999999999" unit="percentage"/>
<parameter name="TOPS" value="40000" unit="numbers"/>
<parameter name="Encryption" value="yes" unit="logical"/>
<parameter name="Storage control options" value="Copy, remove and modify access controls, restore archived data, move to different layer, replicate" unit="text"/>
```

Thus, the cloud storages service description block provides information about cloud services providers including storage options and main characteristics. Main characteristics include: cloud provider names, operation names, storage name, data storage geo-location, operation pay rate (per megabyte or per operation) with name and description, duration of storing, and others. The format is extendable and allows for the addition of new types of fields and descriptions. Using a unified xml cloud storage description format allows a vendor of the cloud backup utility to easily add new cloud providers or change options without changing or substantially changing the UT.

In a specific embodiment, the xml formatted cloud description file includes a “catalog” tag. The “catalog” tag contains other catalogs, describing tags and ‘price’ tags. Each xml tag can contain different attributes. All included tags for the current tag inherit all ancestor attributes. For example, a cloud storage tier can be represented by the catalog. For purposes of example, the ‘price’ tag information is hereinafter used to calculate a pricing of operations such as backup, restore or data transition.

Below is an example of a price tag.

<price value=“0.05 USD/1000 requests” operation_type=“count” operation_name=“Write”

Table H below shows some further examples of attributes that may be included in a cloud description file for a cloud storage provider such as Amazon Web Services (AWS).

TABLE H

| Attribute | Description |
|---|---|
| operation_name = “Storage” | A named type of the operation. Operation name is dependent of the cloud backup storage. For example, there are names for Amazon Web Services (AWS) cloud storage such as “Select Data Scanned,” “Accelerated Data Transfer In - over all other locations,” “Data Retrievals,” “Data Returned,” “Data Scanned,” “Delete Requests,” “Get, Select and other requests,” “Inter-Region Acceleration Data Transfer Out,” “Inter-Region Data Transfer Out,” “Lifecycle Transition Requests into Glacier,” “Lifecycle transitions,” “Put Requests,” “Select Data Returned,” “Storage management possibility” |
| operation_type = “datavolume” | A type of the operation. Examples of operation_type values include “yes or no,” “count,” “datavolume” |
| name = “S3 Standard Storage” | Used to give a name to the catalog |
| short_name = “Blob catalog” | Used to give a short name to the catalog |

TABLE H-continued

| Attribute | Description |
|---|---|
| value = “0.023 USD/GB” | Used to calculate a price as it is a price for some unit. Examples of values of different types include “0.023 USD/GB,” “0.0007 USD/1000 requests” |
| condition = “First 50 TB/Month” | Used to set a condition for pricing calculation for the current price |
| region = “US East (N. Virginia)” | A geographical location of a cloud storage |
| description = “Services on AWS provider” | A textual description of an item |
| unit = “USD” | A currency unit for pricing calculation |

Table I below shows some additional examples of attributes that may be included in a cloud description file for a cloud storage provider such as Microsoft Azure.

TABLE I

| Attribute | Description |
|---|---|
| redundancy = “LRS” | Locally Redundant Storage (LRS) provides for all data in the storage account to be made durable by replicating transactions synchronously to three different storage nodes within the same region. |
| storage_type = “HOT” | Azure storage offers different access tiers, which allow for storing blob object data in a cost-effective manner. The available access tiers include hot, cool, and archive. Hot is optimized for storing data that is accessed frequently. Cool is optimized for storing data that is infrequently accessed and stored for at least 30 days. Archive is optimized for storing data that is rarely accessed and stored for at least 180 days with flexible latency requirements (on the order of hours). |

Table J below shows, as an example, an excerpt of information that may be found in a cloud description XML file such as for Amazon Web Services.

TABLE J

```
<?xml version=‘1.0’ encoding=‘UTF-8’?>
<catalog name = “Amazon Services” description = “Services on AWS provider” unit = “USD” >
    description = “Amazon S3 is an object storage service built to store and retrieve data and
provides customers with flexibility in the way they manage data for cost optimization, access
control, and compliance. Amazon S3 is the only cloud storage solution with query-in-place
functionality, allowing you to run analytics directly on your data at rest.”>
    <parameter name=“Data durability” value=“99.999999999” unit=“percentage” />
    <parameter name=“Designed for availability” value=“99.99999999” unit=“percentage” />
    <parameter name=“Availability SLA” value=“99.99999999” unit=“percentage” />
    <parameter name=“First byte latency” value=“100” unit=“milliseconds” />
    <parameter name=“IOPS” value=“40000” unit=“numbers” />
    <parameter name=“Encryption “ value=“yes” unit=“logical” />
    <parameter name=“Lifecycle management” value=“yes” unit=“logical” />
    <parameter name=“Retrieval fee” value=“yes” unit=“logical” />
    <parameter name=“Storage control options” value=“Copy, remove and modify access
controls, restore archived data, move to different layer, replicate” unit=“text” />
    <catalog name = “Amazon S3 Service” region = “US East (N. Virginia)”>
        description = “Amazon S3 is an object storage service built to store and retrieve data and
provides customers with flexibility in the way they manage data for cost optimization, access
control, and compliance. Amazon S3 is the only cloud storage solution with query-in-place
functionality, allowing you to run analytics directly on your data at rest.”>
        <catalog name = “S3 Standard Storage” >
            <catalog operation_name = “Storage” operation_type = “datavolume” >
                <price value = “0.023 USD / GB” condition = “First 50 TB / Month”>
                <price value = “0.022 USD / GB” condition = “Next 450 TB / Month”>
                <price value = “0.021 USD / GB” condition = “Over 500 TB / Month”>
            </catalog>
            <catalog operation_name = “Put Requests” operation_type = “count” >
                <price value = “0.005 USD / 1000 requests”>
            </catalog>
            <catalog operation_name = “Get, Select and other requests” operation_type = “count” >
                <price value = “0.0004 USD / 1000 requests”>
```

TABLE J-continued

```
            </catalog>
            <catalog operation__name = "Select Data Returned" operation__type = "count" >
                <price value = "0.0007 USD / 1000 requests">
            </catalog>
            <catalog operation__name = "Select Data Scanned" operation__type = "count" >
                <price value = "0.002 USD / 1000 requests">
            </catalog>
            <catalog operation__name = "Delete Requests" operation__type = "count" >
                <price value = "0 USD / 1000 requests">
            </catalog>
        </catalog>
</catalog>
. . .
```

The analyzer or solving block makes calculations and provides the calculation logic. The analyzer receives as input information from the user interface (e.g., graphical user interface), activity collector, and cloud storages service description block and prepares the data to display in reports.

Figure 6:
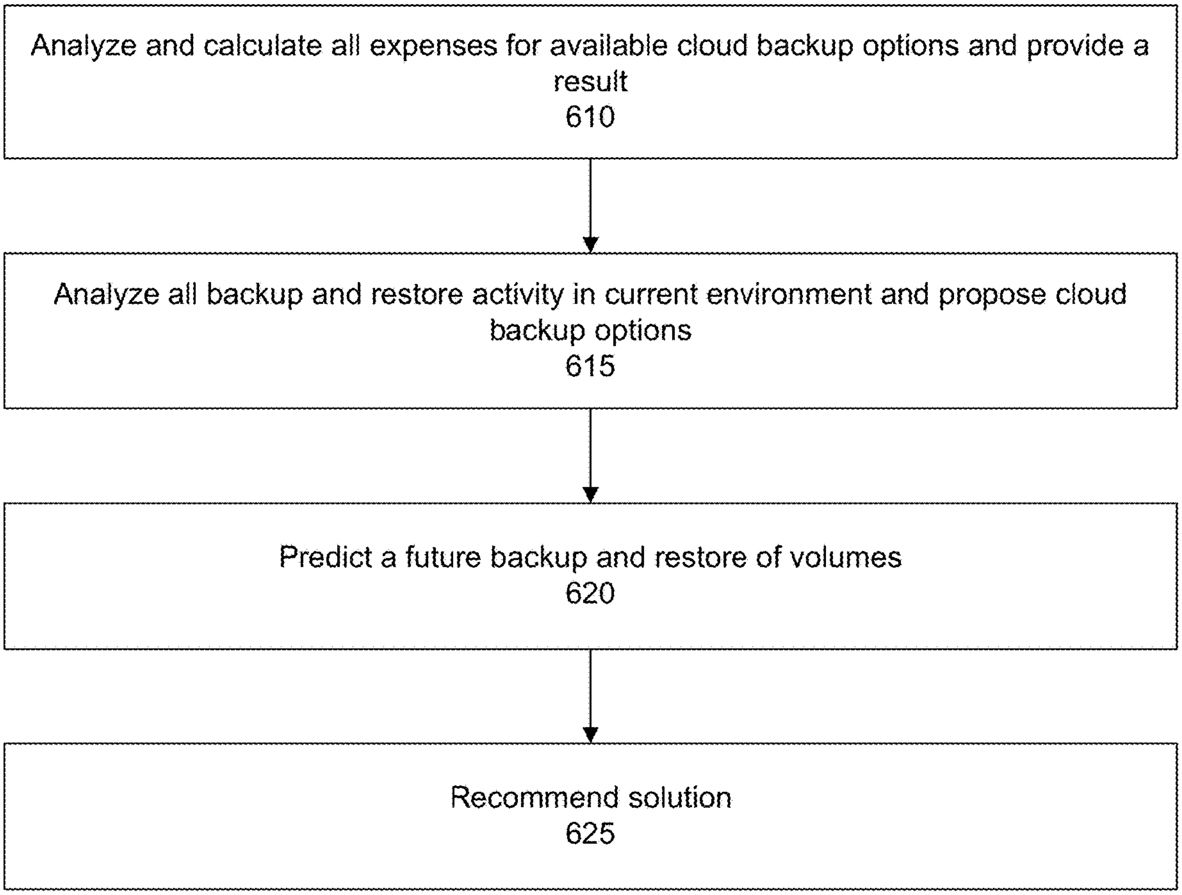
FIG. 6 shows another overall flow of the utility, according to one or more embodiments.

FIG. 6 shows a flow diagram of functions that may be performed by the cloud backup utility, and more specifically, the analyzer according to one or more embodiments. In a specific embodiment, the analyzer is responsible for analyzing and calculating all expenses for available cloud backup options and providing a result (block 610); analyzing all backup and restore activity in the current information processing environment of a customer and proposing cloud backup options (block 615); predicting future backup and restore of volumes (block 620); and recommending a cloud backup solution or cloud backup provider (block 625).

In block 610 (analyze and calculate all expenses for available cloud backup options and provide a result), the analyzer (e.g., solving block) receives as user input from the customer via the user interface a selection of storages, applications, or backup applications to assess against different cloud storage providers; start and end times defining a past activity period of backups and restore operations to assess against the different cloud storage providers; logical conditions (e.g., backup schedule names, pool names, geographical location, or other conditions); a structure or configuration of cloud backup entered by a customer via the user interface (e.g., layers, transitions, or retention policies); or combinations of these.

In a specific embodiment, the analyzer further accepts as input information from the activity collector in a summarized mode and calculates pricing by formulas with the use of cloud storages service description files. As discussed the cloud storage description files include information describing how pricing is prepared for particular types of cloud storage. In a specific embodiment, a matching operation matches a pricing item to an operation type (from cloud storages service description file) and logical conditions. A formula for price calculation can then be applied.

For example, a formula to calculate a price for operations may be as follows:

price for operations=number of operations*operation price

As another example, a formula to calculate a price for backup and restorations may be as follows:

price for backup/restoring=amount of data*price for data unit (Mb) backup or restore The total overall price may be calculated by summing the sub-totals or prices for the various actions, operations, and storage usage that would have been charged based on the past historical activity data. In a specific embodiment, the formula may be abstracted to a format where each calculable price item has multiplicand and multiplier. The multiplicand is a number of operations or amount of data. The multiplier is the operation price or price for data unit. The multipliers are taken from the service description block (e.g., retrieved from a cloud description file). The multiplicands are taken from the past historical activity data obtained by the activity collector from the DPA database. The information returned by the activity collector provides the details to fill in the multiplicands to calculate a total price as the activity collector is aware of the necessary operations required for calculation of the price (for example: "List and Create container," "Read" or "Other" operations for Azure cloud).

In cases where the information returned by the activity collector is insufficient, the customer user is prompted to enter the missing data manually to fill the gap. For example, in a specific embodiment, a scoring algorithm of the cloud backup utility may include certain parameters that are required for scoring the cloud storage providers. If the activity collector is unable to retrieve the values for the required parameters, the cloud backup utility prompts the user to supply the missing values for the required parameters.

After calculation of a price for each individual item, a total amount of items is calculated to obtain a total price.

In block 615 (analyze all backup and restore activity in current environment and propose template variants of cloud backup provider options), the analyzer (e.g., solving block) receives as user input from the customer via the user interface a selection of storages, applications or backup applications to assess against different cloud storage providers; start and end times defining a past activity period of backup and restore operations to assess against the different cloud storage providers; logical conditions (e.g., backup schedule names, pool name, or other logical condition); or combinations of these. The output may include a structure of cloud backup configurations including, for example, transitions, retention policies, and other configuration to display in GUI.

In a specific embodiment, a method includes storing a first function to calculate a first sub-total for completing a first number of operations of a first type, the first function comprising a first variable, a first unit price, and specifying multiplying the first variable by the first unit price; storing a second function to calculate a second sub-total for completing a second number of operations of a second type, different from the first type, the second function comprising a second variable, a second unit price, and specifying multiplying the second variable by the second unit price; and storing a third function to calculate a third sub-total for storing an amount of data, the third function comprising a third variable, a third unit price, and specifying multiplying the third variable by the third unit price.

In this specific embodiment, the method further includes obtaining, from a data protection advisor, a first value indicating a count of the first number of operations of the first type that were completed during a time period; obtaining, from the data protection advisor, a second value indicating a count of the second number of operations of the second type that were completed during the time period; and obtaining, from the data protection advisor, a third value indicating the amount of data stored during the time period.

In this specific embodiment, the method further includes obtaining, from a first cloud description file of a first cloud provider, a fourth value indicating a first unit price charged by the first cloud provider; obtaining, from the first cloud description file, a fifth value indicating a second unit price charged by the first cloud provider; obtaining, from the first cloud description file, a sixth value indicating a third unit price charged by the first cloud provider; applying the first, second, and third functions using the first, second, third, fourth, fifth, and sixth values to obtain first, second, and third sub-totals representing first, second, and third sub-costs, respectively, that would have been charged to a customer by the first cloud provider for the first number of operations of the first type during the time period, the second number of operations of the second type during the time period, and storing the amount of data during the time period; and summing the first, second, and third sub-costs to obtain a first total cost that would have been charged by the first cloud provider;

In this specific embodiment, the method further includes obtaining, from a second cloud description file of a second cloud provider, a seventh value indicating a first unit price charged by the second cloud provider; obtaining, from the second cloud description file, an eighth value indicating a second unit price charged by the second cloud provider; obtaining, from the second cloud description file, a ninth value indicating a third unit price charged by the second cloud provider; applying the first, second, and third functions using the first, second, third, seventh, eighth, and ninth values to obtain fourth, fifth, and sixth sub-totals representing fourth, fifth, and sixth sub-costs, respectively, that would have been charged to the customer by the second cloud provider for the first number of operations of the first type during the time period, the second number of operations of the second type during the time period, and storing the amount of data during the time period; and summing the fourth, fifth, and sixth sub-costs to obtain a second total cost that would have been charged by the second cloud provider.

In this specific embodiment, the method further includes comparing the first and second total costs; and recommending one of the first or second cloud provider based on the comparison.

In block 620 (predict a future backup/restore volumes), the analyzer (e.g., solving block) can use a mathematical apparatus or apply a function or statistical function to predict future backup/restore growth including future cost estimates. In a specific embodiment, the analyzer receives as user input from the UI a selection of storages, applications or backup applications to assess; start and end times defining the past activity period; logical conditions (e.g., backup schedule names, pool name, or other logical condition); a period to predict; or combinations of these. In a specific embodiment, the output includes the backup/restore growth for the selected period.

In a specific embodiment, a function to predict future growth including storage utilization for backups is based on rates of data growth and retention policies of the enterprise customer. Predicting the amount of storage capacity that may be needed at a future time can help with the enterprise customer's financial planning.

In a specific embodiment, a method includes receiving starting and ending dates defining an activity period during which backup operations occurred; dividing the activity period into a first sub-period and a second sub-period; determining a difference in an amount of data backed up between the first and second sub-periods to calculate a rate of data growth from the first sub-period to the second sub-period; reviewing a retention policy associated with the backup operations to determine a retention duration after which a backup is to be deleted; receiving starting and ending dates defining a future activity period; and calculating a predicted amount of backup data for the future activity period based on the retention duration and the rate of data growth.

For example, the cloud backup utility may receive first user input defining an activity period for the past year, and second user input defining a future activity period as being a new upcoming year after the past year. The cloud backup utility can divide the activity period into a set of sub-periods to estimate a rate of data growth from one sub-period to another sub-period. For example, the past year's activity period may be divided into 12 months. The cloud backup utility can review the amount of data backed up each month to calculate a rate of data growth from month to month. The rate of data growth, in conjunction with the customer enterprise's retention policy allows the cloud backup utility to predict, for example, the amount of storage that will be needed for the new upcoming year.

A similar technique may be used to predict an amount of data that may be expected to be restored in the new upcoming year (or other future time period). Cloud storage providers may charge based on the amount of data transferred from cloud storage back to the customer site. Predicting the amount of data transfer, such as may occur during restoration operations, can help the enterprise customer anticipate future costs. For example, a method may calculate a difference in an amount of data restored between two past sub-periods to determine a rate at which data is restored. The rate of restoration can be applied to the future period to estimate the amount of data that may be restored during the future period and thus calculate a cost that the cloud storage provider may charge to the customer enterprise.

In block 625 (recommend solution), an algorithm analyses the customer's current hardware and software configuration and recommends additions to acquire to move the data to the cloud. In a specific embodiment, information about the customer's current hardware and software configuration may be stored by the DPA. The analyzer, via the activity collector, can obtain the configuration information from the relevant DPA database tables containing information about the customer's hardware and software configuration.

When the information is available, the algorithm can provide recommendations. A key piece of information includes versioning information about products. If this information is available it allows the algorithm to determine what add-on (e.g., additional software module) is necessary to setup and add cloud data protection options to the customer's current software configuration. Instead or additionally, the customer can manually enter via the user interface the necessary information in order to receive the recommendation.

For example, in some cases, a vendor of the customer's backup application system, cloud backup utility, or both may have developed additional add-ons, extensions, libraries, plug-ins, software modules, and the like that can integrate with certain versions of the backup application to allow backups to be written to (and retrieved from) a cloud storage of a cloud provider. However, these additional modules may not necessarily be installed with the backup application as the customer may have decided, at the time the backup application was purchased, to store backups locally or on infrastructure owned and maintained by the customer enterprise or the software modules may not have been available.

In a specific embodiment, there is a correlation table that lists a set of modules associated with different cloud providers, and identifies compatibility with different versions of a backup application. The correlation table can be scanned using the versioning information about the backup application installed at the customer site to identify modules that are compatible with the backup application version installed at the customer site and thus, upon installation or upgrade of the backup application with the identified modules, allow backups to be stored at a cloud storage of a cloud storage provider.

In a specific embodiment, there is a method including maintaining a correlation table specifying compatibility of a plurality of modules to different versions of a backup application, each module comprising an application programming interface (API) and logic to enable a specific version of the backup application to backup to a specific cloud storage provider; obtaining configuration details about a backup application installed at a customer site in which backups by the backup application are stored at the customer site, the configuration details comprising versioning information about the backup application; scanning the correlation table to cross-reference the versioning information and identify a module of the plurality of modules that is compatible with the backup application installed at the customer site; and transmitting the identified module to the customer site to allow the backup application to store the backups at a cloud storage of a cloud storage provider, the cloud storage being remote from the customer site.

In another specific embodiment, the data protection advisor communicates with the data protection manager to run recommendations from the data protection advisor. The recommendations may include, for example, which packages for cloud backup to install and applying packages settings for cloud data protection.

In a specific embodiment, the analyzer (e.g., solving block) of the cloud backup utility calculates an overall solution rank. The analyzer can provide a generalized assessment of the solution according to a weighted sum of all metrics selected by customer.

In this specific embodiment, there is a formula provided to calculate a rank of a solution by its main comparable characteristics. The formula measures all criteria on similar numerical scales and applies customer's importance (weights) to characteristics to rank the solution. There is one condition: sum of weights should be 100 percent (which is can be guaranteed or enforced by the user interface). The formula that uses these weights allows for calculation of a weighted average to obtain an overall score for each solution.

Below is an example of a formula for ranking cloud storage providers based on customer applied weights to various characteristics of cloud storage features.

$$\text{Rank} = \sum_{k=0}^{n} X_i * w_i$$

Where $X_i$ is normalized value of characteristic (ranges from 0 to 1 ascending from the worse to the best option) $X_i$ is calculated by the following formulas:

if a characteristic type is 'Percentage'

$$X = \frac{P_{max} - P}{P_{max} - P_{min}}, \text{ where } P = \log_{10}(100 - x)$$

if a characteristic type is 'Linear (growing)'

$$X = \frac{x - x_{min}}{x_{max} - x_{min}}$$

if a characteristic type is 'Linear (decreasing)'

$$X = \frac{x_{max} - x}{x_{max} - x_{min}}$$

if a characteristic type is 'Logical'

$X$=0 (if $x$ is false) or 1 (if $x$ is true)

Where $w_i$ is weight in percentage of a given characteristic, x is current value, $x_{min}$, $x_{max}$ are maximal and minimal values of x. So that the final rank ranges from 0 to 100.

Referring back now to FIG. 3, in a specific embodiment, the user interface allows a customer to interface with the cloud backup utility. For example, the customer may use the user interface to select the source data to be backed up to cloud backup storages and tune or set initial parameters including, for example, a) choosing a historical data period from which activity data stored on the DPA server should be collected (e.g., choosing a "from" date and a "to" date); b) choosing what, how, and when to store in cloud storage (e.g., choosing from what server(s), choosing which current jobs to associate with cloud storage, or choosing how often (e.g., once a "what" period); c) entering additional variables (e.g., is current data divided by tiers, e.g., bronze, silver, or gold, and entering retention requirements (e.g., entering retention period, and actions or what to do after the data expires such as delete or transmit or move to another tier, or deciding on storage management); and d) identifying which cloud providers are to be used.

In a specific embodiment, the cloud backup utility generates and builds storage plans specific to each cloud backup provider. The customer user can review the storage plans and decide with storage plan to apply with a cloud backup provider. The user interface can display recommendations about the type of cloud storage and data transitions to other storages based on the customer's current backup activities.

In a specific embodiment, the cloud backup utility builds a planned backup/restoration environment in a selected cloud storage option. In a specific embodiment, the user interface includes an advisor. The advisor helps a customer to build a visual view of the basic blocks of the cloud storage options, connect the blocks by connector lines and set its properties. The customer user, via the user interface, is allowed to select different tiers (e.g., different tiers or levels of storage), set or adjust retention periods and set conditional actions (for example for different types of the input data).

For example, a review of past historical activity of the customer may reveal that backups, as they age, are periodically migrated or transitioned from a first type of storage offering high performance to a second type of storage offering lower performance (e.g., slower access or read times as compared to the first type of storage). The cloud backup utility can use this discovery develop a customized storage plan for a specific cloud provider that specifies transitioning backups from a first type of cloud storage offered by the specific cloud provider to a second type of cloud storage offered by the specific cloud provider, where the second type of cloud storage is less expensive than the first type of cloud storage and offers slower performance than the first type of cloud storage. If the customer ultimately selects the specific cloud provider, the cloud backup utility can automatically apply the customized storage plan to the corresponding settings and options of the cloud provider to enable data transitions from the first type of cloud storage to the second type of cloud storage.

The user interface advisor can provide the customer with hints or tips such as what information is more appropriate to use as a source of input variables, what information is not available (and is necessary to input) to check some cloud backup plan, highlight variables which are not filled or are missing input values.

Reports and results generated by the cloud backup utility may be shown via the user interface. In a specific embodiment, a report includes information about cloud storage plans for a selected vendor including its infrastructure.

their overall corresponding scores to help the decision maker determine which is preferable.

In a specific embodiment, there is a special settings window which allows the customer user set a weight for each characteristic in percentage units to calculate the overall rank of the solution. In a specific embodiment, the customer user can set weights for each characteristic in percent format from 0 percent to 100 percent, where a sum of the weights is equal to 100 percent. Assigning weights may be limited to selecting only necessary numeric or logical characteristics. There can be a validation module to ensure that the sum of weights equal to 100 percent. Customers are given the flexibility to decide which characteristics are more or less important, which characteristic to consider, and which weights to set (by including or excluding some from calculation).

Some examples of additional parameters that may be included in a detailed report are shown in the tables above (e.g., tables E and F). For example, report may include parameters for storage management capabilities, first-byte latency, availability percent, storage management, and other parameters.

Table K below shows an example of a report.

TABLE K

| Solution number | Description | Rank | Pricing $/week | First-byte latency (ms) | Availability percent | Storage mgmt |
|---|---|---|---|---|---|---|
| 1 | NetWorker with CloudBoost backup to AWS | 95.092 | 2000 | 100 | 99.99 | yes |
| 2 | NetWorker with CloudBoost backup to Azure | 89.12 | 1893 | 120 | 99.99 | yes |
| 3 | NetWorker with CloudBoost backup to Google cloud | 50.89 | 1400 | 385 | 99.99 | yes |

The report is built or designed so that the customer can view the main characteristics of each of the different cloud storage providers and be able to compare among them. In many cases, the main characteristic a customer user is likely to be interested in is price. The report may be show in a table format so as to allow easy comparison of different options by the value of the parameters. The columns in the table may be sortable so that user can sort by parameter values.

Detailed information about each option in the report is available. Detailed information includes, for example, payment details for each payable item (payment for data storing, transition, and other cloud service options). Sub-elements of pricing may include backup price, restore price, data storing price, data transition price, and others. The report allows customer users to view the data according to different levels of granularity. For example, a customer user may view by backup, by storage, or by operations. The report user interface also allows users to select a period to forecast a pricing. For example, the customer user may select a month to forecast or a year to forecast.

A decision maker must prioritize many alternatives. In a specific embodiment, a cloud storage solution (e.g., cloud storage provider) is ranked by multiple criteria. The ranking allows the decision maker to pick or select a winner from among the several solutions (e.g., cloud storage providers), based on several criteria. A rank of the solutions (e.g., cloud storage providers) helps to facilitate the decision. In a specific embodiment, an overall score is calculated. The final report can rank each solution (e.g., cloud provider) by In a specific embodiment, the report is interactive. For example, the customer user may select characteristics to show or hide by, for example, double clicking on a column. The customer user may drilldown on items show in the report to view additional details such as cloud backup infrastructure details. Cloud backup infrastructure details may include tier name, operations available including storage pricing, retention period, transition to another storage operations, and other infrastructure details. A visual tool may be provided to represent backup structure by connecting a current infrastructure symbols with cloud service providers infrastructure symbols.

In a specific embodiment, the user interface lists additional hardware components, software components, or both that may be required to migrate backups or data protection from the customer site to a cloud site, remote from the customer site. Examples of backup systems that may be in use by the customer include Avamar and Networker as provided by Dell EMC. The cloud backup utility may, for example, identify a software module (e.g., Cloud Boost) that integrates with Avamar (or Networker) to move data protection to the cloud.

In a specific embodiment, the user interface further includes a link or option for "help" (e.g., "request an expert help"). The customer can click the link to obtain live expert help regarding details on how to implement migration to a cloud backup system (or obtain answered to other questions). Clicking the link can launch an external browser and open a web page where the customer may receive help from product experts (e.g., Dell EMC experts). In another specific embedment, the cloud backup utility may include a user-selectable option "send a bundle to experts" that sends to experts additional information about the customer's environment and settings which customer made previously in the user interface. Experts can further analyze the additional information to provide more complete help to the customer.

Figure 7:
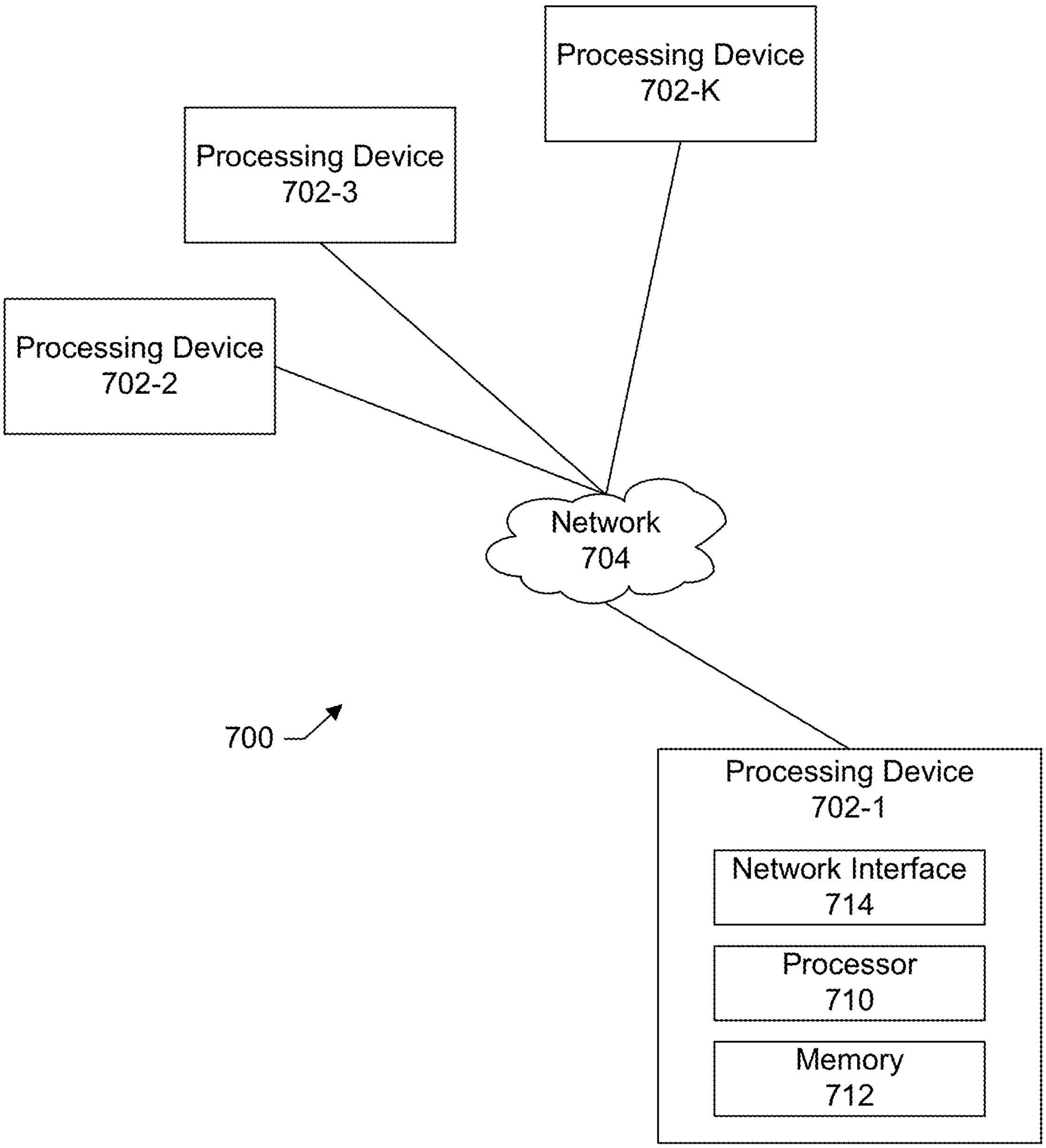
FIG. 7 shows a block diagram of a processing platform that may be utilized to implement at least a portion of an information processing system, according to one or more embodiments.

FIG. 7 shows an example of a processing platform 700. The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 8:
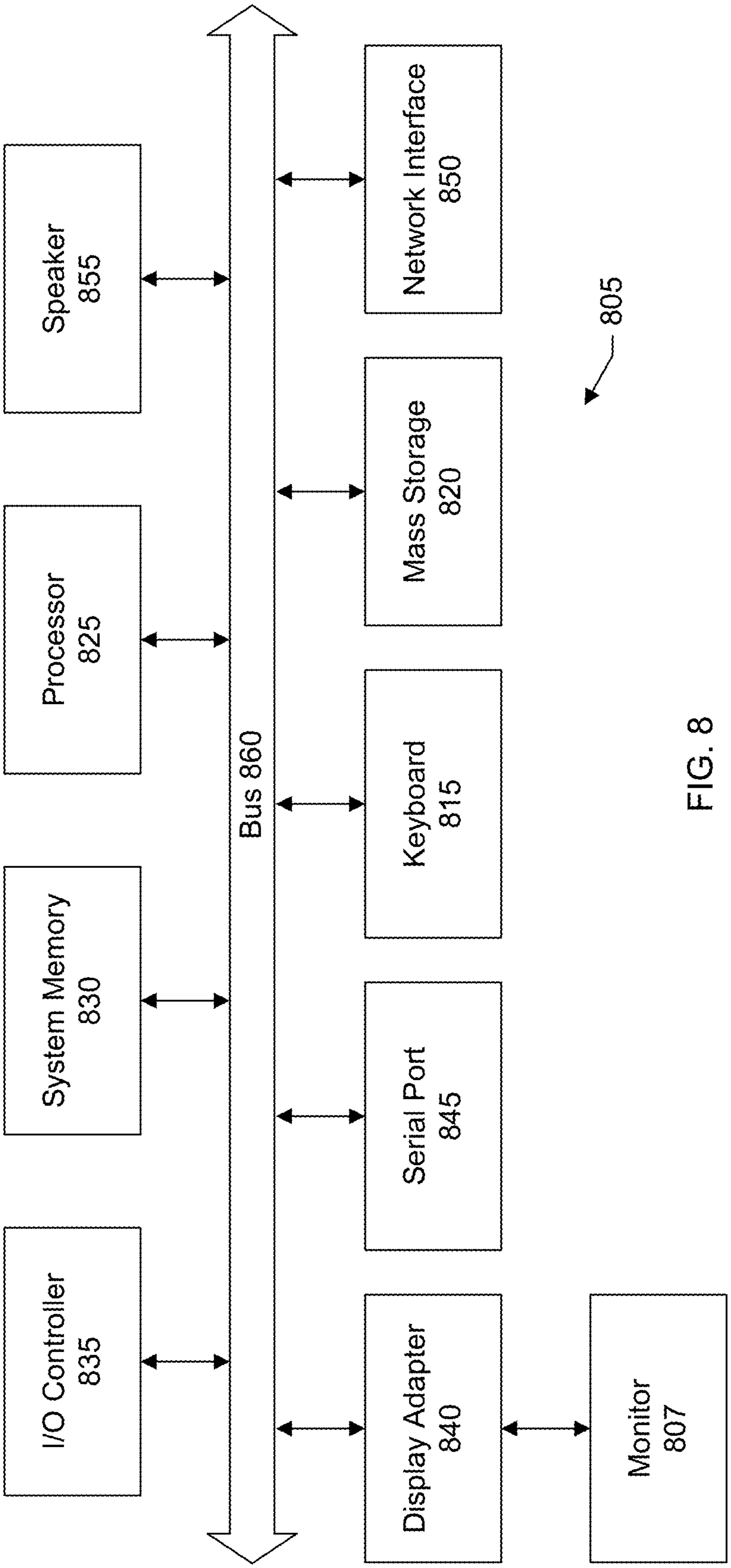
FIG. 8 shows a block diagram of a computer system suitable for use with the information processing system, according to one or more embodiments.

FIG. 8 shows a system block diagram of a computer system 805 used to execute the software of the present system described herein. The computer system includes a monitor 807, keyboard 815, and mass storage devices 820. Computer system 805 further includes subsystems such as central processor 825, system memory 830, input/output (I/O) controller 835, display adapter 840, serial or universal serial bus (USB) port 845, network interface 850, and speaker 855. The system may also be used with computer systems with additional or fewer subsystems. For example, a computer system could include more than one processor 825 (i.e., a multiprocessor system) or a system may include a cache memory.

Arrows such as 860 represent the system bus architecture of computer system 805. However, these arrows are illustrative of any interconnection scheme serving to link the subsystems. For example, speaker 855 could be connected to the other subsystems through a port or have an internal direct connection to central processor 825. The processor may include multiple processors or a multicore processor, which may permit parallel processing of information. Computer system 805 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, there is a method comprising: retrieving historical activity data stored by a data protection advisor, the historical activity data comprising metadata about backups and restorations that were monitored by the data protection advisor for a user of the data protection advisor; receiving a plurality of description files corresponding to a plurality of cloud storage providers, each description file comprising a name of a respective cloud storage provider, a catalog listing a plurality of cloud service options offered by the respective cloud storage provider, and pricing and descriptive information for the plurality of cloud service options; mapping the historical activity data to the plurality of cloud service options offered by each of the plurality of cloud storage providers; generating a plurality of cost figures associated with the plurality of cloud storage providers based on the mapping, each cost figure representing a cost that would have been charged to the user, based on the historical activity data, by the respective cloud storage provider for storing the backups and accessing the backups for the restorations; generating a rating of the plurality of cloud storage providers using the associated cost figures; and displaying, in a user interface, the names of the plurality of cloud storage providers from the plurality of description files, and the rating to allow the user to select a particular cloud storage provider to which the backups are to be migrated.

The method may further include receiving a first description file corresponding to a first cloud storage provider, the first description file comprising a first unit price charged by the first cloud storage provider for data storage; receiving a second description file corresponding to a second cloud storage provider, different from the first cloud storage provider, the second description file comprising a second unit price charged by the second cloud storage provider for the data storage; obtaining, from the historical activity data, a size of backup data stored during a period covered by the historical activity data; multiplying, based on the mapping, the size by the first unit price to determine a first cost that would have been charged by the first cloud storage provider for storing the backup data; multiplying, based on the mapping, the size by the second unit price to determine a second cost that would have been charged by the second cloud storage provider for storing the backup data; comparing the first and second costs; assigning a first score to the first cloud storage provider, and a second score to the second cloud storage provider based on the comparison; and ranking the first and second cloud storage providers according to the first and second scores.

The method may further include receiving a first description file corresponding to a first cloud storage provider, the first description file comprising a first unit price charged by the first cloud storage provider for data operations; receiving a second description file corresponding to a second cloud storage provider, different from the first cloud storage provider, the second description file comprising a second unit price charged by the second cloud storage provider for the data operations; obtaining, from the historical activity data, a count of the data operations that occurred during a period covered by the historical activity data; multiplying, based on the mapping, the count of the data operations by the first unit price to determine a first cost that would have been charged by the first cloud storage provider for the data operations that occurred during the period; multiplying, based on the mapping, the count of the data operations by the second unit price to determine a second cost that would have been charged by the second cloud storage provider for the data operations that occurred during the period; comparing the first and second costs; assigning a first score to the first cloud storage provider, and a second score to the second cloud storage provider based on the comparison; and ranking the first and second cloud storage providers according to the first and second scores.

In an embodiment, there is a first description file corresponding to a first cloud storage provider comprises a first unit price charged by the first cloud storage provider for storing an amount of data falling within a first range, and a second unit price charged by the first cloud storage provider for storing an amount of data falling within a second range, different from the first range, and the mapping further comprises: obtaining, from the historical activity data, a size of backup data stored during a period covered by the historical activity data; determining whether the size of the backup data falls within the first range or the second range; when the size of the backup data falls within the first range, mapping the size of the backup data to the first unit price; and when the size of the backup data falls within the second range, mapping the size of the backup data to the second unit price.

The method may further include prompting the user to select a future time period; reviewing the historical activity data and data retention durations for the backups to estimate a size of backup data to be stored during the future time period; consulting a first description file comprising a first unit price charged by a first cloud storage provider for data storage; and multiplying the estimated size of the backup data by the first unit price to forecast a cost to be charged by the first cloud storage provider.

The method may further include prompting the user to assign weights to a plurality of characteristics associated with the plurality of cloud storage providers, each weight indicating a degree of importance of a characteristic to the user relative to other characteristics; and performing weighted average calculations with the assigned weights to generate the rating.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:

receiving, by a cloud backup utility, one or more parameters from a user defining historical activity data to be retrieved, the historical activity data being stored by a data protection advisor of an on premise data protection backup application installed at a customer site, wherein the the historical activity data comprising metadata for past backups and restorations that were monitored by the data protection advisor for a user of the data protection advisor, the past backups having been performed by the on premise data protection backup application and stored in on premise backup storage, and the past restorations having been retrieved from the on premise backup storage and restored to clients of the on premise data protection backup application, and wherein the one or more parameters comprise a time period specifying a starting and ending data of the historical activity data to retrieve from the data protection advisor;

retrieving, by the cloud backup utility, the historical activity data according to the one or more parameters;

receiving a plurality of description files corresponding to a plurality of cloud storage providers, each description file comprising a name of a respective cloud storage provider, a catalog listing a plurality of cloud service options offered by the respective cloud storage provider, and pricing and descriptive information for the plurality of cloud service options;

mapping the historical activity data to the plurality of cloud service options offered by each of the plurality of cloud storage providers;

backtesting each of the plurality of cloud storage providers by generating a plurality of cost figures associated with the plurality of cloud storage providers based on the mapping, each cost figure representing a cost that would have been charged to the user, based on the historical activity data, by the respective cloud storage provider for storing the backups and accessing the backups for the restorations;

generating a rating of the plurality of cloud storage providers using the associated cost figures; and displaying, in a user interface, the names of the plurality of cloud storage providers from the plurality of description files, and the rating to allow the user to select a particular cloud storage provider to which the backups are to be migrated;

receiving, from the user, a selection of the particular cloud storage provider;

installing, at the customer site of the one premise data protection backup application, a migration module, specific to the particular cloud storage provider that was selected;

migrating, via the migration module, the backups to the particular cloud storage provider; and issuing a command via an application programing interface associated with the particular cloud storage provider to automatically set a retention parameter and a lifecycle parameter for the backups.

2. The method of claim 1 further comprising:

receiving a first description file corresponding to a first cloud storage provider, the first description file comprising a first unit price charged by the first cloud storage provider for data storage;

receiving a second description file corresponding to a second cloud storage provider, different from the first cloud storage provider, the second description file comprising a second unit price charged by the second cloud storage provider for the data storage;

obtaining, from the historical activity data, a size of backup data stored during a period covered by the historical activity data;

multiplying, based on the mapping, the size by the first unit price to determine a first cost that would have been charged by the first cloud storage provider for storing the backup data;

multiplying, based on the mapping, the size by the second unit price to determine a second cost that would have been charged by the second cloud storage provider for storing the backup data;

comparing the first and second costs;

assigning a first score to the first cloud storage provider, and a second score to the second cloud storage provider based on the comparison; and ranking the first and second cloud storage providers according to the first and second scores.

3. The method of claim 1 further comprising:

receiving a first description file corresponding to a first cloud storage provider, the first description file comprising a first unit price charged by the first cloud storage provider for data operations;

receiving a second description file corresponding to a second cloud storage provider, different from the first cloud storage provider, the second description file comprising a second unit price charged by the second cloud storage provider for the data operations;

obtaining, from the historical activity data, a count of the data operations that occurred during a period covered by the historical activity data;

multiplying, based on the mapping, the count of the data operations by the first unit price to determine a first cost that would have been charged by the first cloud storage provider for the data operations that occurred during the period;

multiplying, based on the mapping, the count of the data operations by the second unit price to determine a second cost that would have been charged by the second cloud storage provider for the data operations that occurred during the period;

comparing the first and second costs;

assigning a first score to the first cloud storage provider, and a second score to the second cloud storage provider based on the comparison; and ranking the first and second cloud storage providers according to the first and second scores.

4. The method of claim 1 wherein a first description file corresponding to a first cloud storage provider comprises a first unit price charged by the first cloud storage provider for storing an amount of data falling within a first range, and a second unit price charged by the first cloud storage provider for storing an amount of data falling within a second range, different from the first range, and the mapping comprises:

obtaining, from the historical activity data, a size of backup data stored during a period covered by the historical activity data;

determining whether the size of the backup data falls within the first range or the second range;

when the size of the backup data falls within the first range, mapping the size of the backup data to the first unit price; and when the size of the backup data falls within the second range, mapping the size of the backup data to the second unit price.

5. The method of claim 1 further comprising:

prompting the user to select a future time period;

reviewing the historical activity data and data retention durations for the backups to estimate a size of backup data to be stored during the future time period;

consulting a first description file comprising a first unit price charged by a first cloud storage provider for data storage; and multiplying the estimated size of the backup data by the first unit price to forecast a cost to be charged by the first cloud storage provider.

6. The method of claim 1 further comprising:

prompting the user to assign weights to a plurality of characteristics associated with the plurality of cloud storage providers, each weight indicating a degree of importance of a characteristic to the user relative to other characteristics; and performing weighted average calculations with the assigned weights to generate the rating.

7. The method of claim 1 wherein the historical activity data comprises retention durations for the past backups, and the backtesting comprises calculating costs that would have been charged to the user by the plurality of cloud storage providers for retaining the past backups for the retention durations.

8. The method of claim 1 wherein the lifecycle parameter specifies a data age at which the backups are moved from a first type of storage to a second type of storage, different from the first type of storage.

9. A system comprising: a processor; and memory configured to store one or more sequences of instructions which, when executed by the processor, cause the processor to carry out the steps of:

receiving, by a cloud backup utility, one or more parameters from a user defining historical activity data to be retrieved, the historical activity data being stored by a data protection advisor of an on premise data protection backup application installed at a customer site, wherein the historical activity data comprises metadata for past backups and restorations that were monitored by the data protection advisor for a user of the data protection advisor, the past backups having been performed by the on premise data protection backup application and stored in on premise backup storage, and the past restorations having been retrieved from the on premise backup storage and restored to clients of the on premise data protection backup application, and wherein the one or more parameters comprise a time period specifying a starting and ending data of the historical activity data to retrieve from the data protection advisor;

retrieving, by the cloud backup utility, the historical activity data according to the one or more parameters;

receiving a plurality of description files corresponding to a plurality of cloud storage providers, each description file comprising a name of a respective cloud storage provider, a catalog listing a plurality of cloud service options offered by the respective cloud storage provider, and pricing and descriptive information for the plurality of cloud service options;

mapping the historical activity data to the plurality of cloud service options offered by each of the plurality of cloud storage providers;

backtesting each of the plurality of cloud storage providers by:

generating a plurality of cost figures associated with the plurality of cloud storage providers based on the mapping, each cost figure representing a cost that would have been charged to the user, based on the historical activity data, by the respective cloud storage provider for storing the backups and accessing the backups for the restorations; wherein the historical activity data comprises retention durations for the past backups; and calculating costs that would have been charged to the user by the plurality of cloud storage providers for retaining the past backups for the retention durations;

generating a rating of the plurality of cloud storage providers using the associated cost figures;

displaying, in a user interface, the names of the plurality of cloud storage providers from the plurality of description files, and the rating to allow the user to select a particular cloud storage provider to which the backups are to be migrated;

receiving, from the user, a selection of the particular cloud storage provider;

installing, at the customer site of the on premise data protection backup application, a migration module, specific to the particular cloud storage provider that was selected;

issuing a command via an applicatoin programming interface associated with the particular cloud storage provider to automatically set a retention parameter and a lifecycle parameter for the backups; and migrating, via the migration module, the backups to the particular cloud storage provider.

10. The system of claim 9 wherein the processor further carries out the steps of:

issuing commands, via the migration module to the particular cloud storage provider, to set storage configuration parameters of the particular cloud storage provider, the storage configuration parameters comprising a data retention duration.

11. The system of claim 9 wherein the processor further carries out the steps of:

receiving a first description file corresponding to a first cloud storage provider, the first description file comprising a first unit price charged by the first cloud storage provider for data storage;

receiving a second description file corresponding to a second cloud storage provider, different from the first cloud storage provider, the second description file comprising a second unit price charged by the second cloud storage provider for the data storage;

obtaining, from the historical activity data, a size of backup data stored during a period covered by the historical activity data;

multiplying, based on the mapping, the size by the first unit price to determine a first cost that would have been charged by the first cloud storage provider for storing the backup data;

multiplying, based on the mapping, the size by the second unit price to determine a second cost that would have been charged by the second cloud storage provider for storing the backup data;

comparing the first and second costs;

assigning a first score to the first cloud storage provider, and a second score to the second cloud storage provider based on the comparison; and ranking the first and second cloud storage providers according to the first and second scores.

12. The system of claim 9 wherein the processor further carries out the steps of:

receiving a first description file corresponding to a first cloud storage provider, the first description file comprising a first unit price charged by the first cloud storage provider for data operations;

receiving a second description file corresponding to a second cloud storage provider, different from the first cloud storage provider, the second description file comprising a second unit price charged by the second cloud storage provider for the data operations;

obtaining, from the historical activity data, a count of the data operations that occurred during a period covered by the historical activity data;

multiplying, based on the mapping, the count of the data operations by the first unit price to determine a first cost that would have been charged by the first cloud storage provider for the data operations that occurred during the period;

multiplying, based on the mapping, the count of the data operations by the second unit price to determine a second cost that would have been charged by the second cloud storage provider for the data operations that occurred during the period;

comparing the first and second costs;

assigning a first score to the first cloud storage provider, and a second score to the second cloud storage provider based on the comparison; and ranking the first and second cloud storage providers according to the first and second scores.

13. The system of claim 9 wherein a first description file corresponding to a first cloud storage provider comprises a first unit price charged by the first cloud storage provider for storing an amount of data falling within a first range, and a second unit price charged by the first cloud storage provider for storing an amount of data falling within a second range, different from the first range, and the processor further carries out the steps of:

obtaining, from the historical activity data, a size of backup data stored during a period covered by the historical activity data;

determining whether the size of the backup data falls within the first range or the second range;

when the size of the backup data falls within the first range, mapping the size of the backup data to the first unit price; and when the size of the backup data falls within the second range, mapping the size of the backup data to the second unit price.

14. The system of claim 9 wherein the processor further carries out the steps of:

prompting the user to select a future time period;

reviewing the historical activity data and data retention durations for the backups to estimate a size of backup data to be stored during the future time period;

consulting a first description file comprising a first unit price charged by a first cloud storage provider for data storage; and multiplying the estimated size of the backup data by the first unit price to forecast a cost to be charged by the first cloud storage provider.

15. The system of claim 9 wherein the processor further carries out the step of:

prompting the user to assign weights to a plurality of characteristics associated with the plurality of cloud storage providers, each weight indicating a degree of importance of a characteristic to the user relative to other characteristics; and performing weighted average calculations with the assigned weights to generate the rating.

16. A computer program product, comprising a non-transitory computer-readable medium having a computer-readable program code embodied therein, the computer-readable program code adapted to be executed by one or more processors to implement a method comprising:

receiving, by a cloud backup utility, one or more parameters from a user defining historical activity data to be retrieved, the historical activity data being stored by a data protection advisor of an on premise daa protection backup application installed at a customer site, wherein the historical activity data comprises metadata for past backups and restorations that were monitored by the data protection advisor for a user of the data protection advisor, the past backups having been performed by the on premise data protection backup application and stored in on premise backup storage, and the past restorations having been retrieved from the on premise backup storage and restored to clients of the on premise data protection backup application, and wherein the one or more parameters comprise a time period specifying a starting and ending date of the historical activity data to retrieve from the data protection advisor, retrieving, by the cloud backup utility, the historical activity data according to the one or more parameters;

receiving a plurality of description files corresponding to a plurality of cloud storage providers, each description file comprising a name of a respective cloud storage provider, a catalog listing a plurality of cloud service options offered by the respective cloud storage provider, and pricing and descriptive information for the plurality of cloud service options;

mapping the historical activity data to the plurality of cloud service options offered by each of the plurality of cloud storage providers;

backtesting each of the plurality of cloud storage providers by generating a plurality of cost figures associated with the plurality of cloud storage providers beased on the mapping, each cost figure representing a cost that would have been charged to the user, based on the historical activity data, by the respective cloud storage provider for storing the backups and accessing the backups for the restorations, generating a rating of the plurality of cloud storage providers using the associated cost figures; and displaying, in a user interface, the names of the plurality of cloud storage providers from the plurality of description files, and the rating to allow the user to select a particular cloud storage provider to which the backups are to be migrated;

receiving, from the user, a selection of the particular cloud storage provider;

installing, at the customer site of the on premise data protection backup application, a migration module, specific to the particular cloud storage provider that was selected;

issuing a command via an application programming interface associated with the particular cloud storage provider to automatically set a retention parameter and a lifecycle parameter for the backups, the lifecycle parameter specifying a data age at which the backups are moved from a first type of storage to a second type of storage, different from the first type of storage; and migrating, via the migration module, the backups to the particular cloud storage provider.

17. The computer program product of claim 16 wherein the method further comprises:

receiving a first description file corresponding to a first cloud storage provider, the first description file comprising a first unit price charged by the first cloud storage provider for data storage;

receiving a second description file corresponding to a second cloud storage provider, different from the first cloud storage provider, the second description file comprising a second unit price charged by the second cloud storage provider for the data storage;

obtaining, from the historical activity data, a size of backup data stored during a period covered by the historical activity data;

multiplying, based on the mapping, the size by the first unit price to determine a first cost that would have been charged by the first cloud storage provider for storing the backup data;

multiplying, based on the mapping, the size by the second unit price to determine a second cost that would have been charged by the second cloud storage provider for storing the backup data;

comparing the first and second costs;

assigning a first score to the first cloud storage provider, and a second score to the second cloud storage provider based on the comparison; and ranking the first and second cloud storage providers according to the first and second scores.

18. The computer program product of claim 16 wherein the method further comprises:

receiving a first description file corresponding to a first cloud storage provider, the first description file comprising a first unit price charged by the first cloud storage provider for data operations;

receiving a second description file corresponding to a second cloud storage provider, different from the first cloud storage provider, the second description file comprising a second unit price charged by the second cloud storage provider for the data operations;

obtaining, from the historical activity data, a count of the data operations that occurred during a period covered by the historical activity data;

multiplying, based on the mapping, the count of the data operations by the first unit price to determine a first cost that would have been charged by the first cloud storage provider for the data operations that occurred during the period;

multiplying, based on the mapping, the count of the data operations by the second unit price to determine a second cost that would have been charged by the second cloud storage provider for the data operations that occurred during the period;

comparing the first and second costs;

assigning a first score to the first cloud storage provider, and a second score to the second cloud storage provider based on the comparison; and ranking the first and second cloud storage providers according to the first and second scores.

19. The computer program product of claim 16 wherein a first description file corresponding to a first cloud storage provider comprises a first unit price charged by the first cloud storage provider for storing an amount of data falling within a first range, and a second unit price charged by the first cloud storage provider for storing an amount of data falling within a second range, different from the first range, and the mapping further comprises:

obtaining, from the historical activity data, a size of backup data stored during a period covered by the historical activity data;

determining whether the size of the backup data falls within the first range or the second range;

when the size of the backup data falls within the first range, mapping the size of the backup data to the first unit price; and when the size of the backup data falls within the second range, mapping the size of the backup data to the second unit price.

20. The computer program product of claim 16 wherein the method further comprises:

prompting the user to select a future time period;

reviewing the historical activity data and data retention durations for the backups to estimate a size of backup data to be stored during the future time period;

consulting a first description file comprising a first unit price charged by a first cloud storage provider for data storage; and multiplying the estimated size of the backup data by the first unit price to forecast a cost to be charged by the first cloud storage provider.

* * * * *